United States Patent [19]

Iwasa et al.

[11] Patent Number: 5,327,411
[45] Date of Patent: Jul. 5, 1994

[54] WRITE CONTROL METHOD AND APPARATUS FOR WRITING OPTICAL DISK DATA

[75] Inventors: Seiichi Iwasa, Sagamihara; Nagaaki Koshino, Yokohama; Kenichi Utsumi, Tama; Masahiro Nakada, Atsugi, all of Japan

[73] Assignee: Fujitsu Limited, Kawasaki, Japan

[21] Appl. No.: 953,188

[22] Filed: Sep. 29, 1992

Related U.S. Application Data

[63] Continuation of Ser. No. 492,899, Mar. 13, 1990.

[30] Foreign Application Priority Data

Mar. 20, 1989 [JP] Japan ................................. 1-68355
Dec. 8, 1989 [JP] Japan ................................. 1-319290

[51] Int. Cl.$^5$ ..................... G11B 7/007; G11B 21/10
[52] U.S. Cl. ....................................... 369/59; 369/54; 369/116
[58] Field of Search ............. 369/100, 116, 109, 59, 369/54, 48, 124, 49, 121, 58; 346/1.1, 76 L

[56] References Cited

U.S. PATENT DOCUMENTS

| | | | |
|---|---|---|---|
| 4,473,829 | 9/1984 | Immink et al. ...................... | 346/1.1 |
| 4,646,103 | 2/1987 | Sugiyama et al. .................. | 369/116 |
| 4,835,759 | 5/1989 | Saito et al. ........................... | 369/48 |
| 4,866,692 | 9/1989 | Saito et al. ........................... | 369/54 |
| 4,873,680 | 10/1989 | Chung et al. ........................ | 369/54 |
| 4,894,816 | 1/1990 | Sukeda et al. ....................... | 369/54 |
| 5,001,692 | 3/1991 | Farla et al. .......................... | 369/116 |
| 5,003,527 | 3/1991 | Matsumoto et al. ................ | 369/100 |

FOREIGN PATENT DOCUMENTS

| | | |
|---|---|---|
| 0266833 | 5/1988 | European Pat. Off. . |
| 0289260 | 11/1988 | European Pat. Off. . |
| 0317193 | 5/1989 | European Pat. Off. . |
| 3804240 | 8/1988 | Fed. Rep. of Germany . |

OTHER PUBLICATIONS

Patent Abstracts of Japan, vol. 13, No. 85 (p. 834), Feb. 27, 1989 for JP 63-26663 (Nov. 2, 1988).

Primary Examiner—W. R. Young
Assistant Examiner—Thang V. Tran
Attorney, Agent, or Firm—Staas & Halsey

[57] ABSTRACT

A write control method for writing optical disk data wherein pits are written by a write signal composed of mark signal parts and space signal parts, and a length of each pit represents the optical disk data, comprising the steps of: converting the mark signal parts to pulses and generating a series of pulse trains which correspond to lengths of the mark signal parts, respectively; controlling a lengths and/or amplitude of each of the pulse trains in accordance with a length of the space signal part immediately before the mark signal part; and applying successively the controlled pulse trains to a laser irradiation device so that the pits are written.

28 Claims, 32 Drawing Sheets

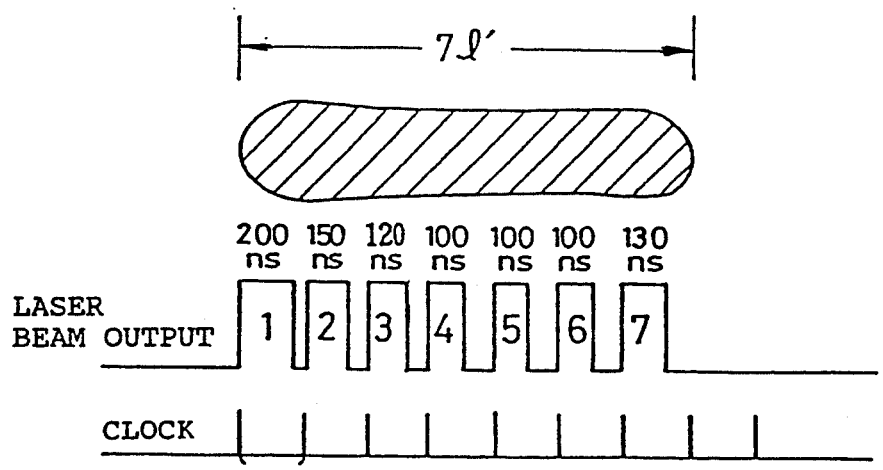
FIG.1(a) (a) WRITING OF 7τ
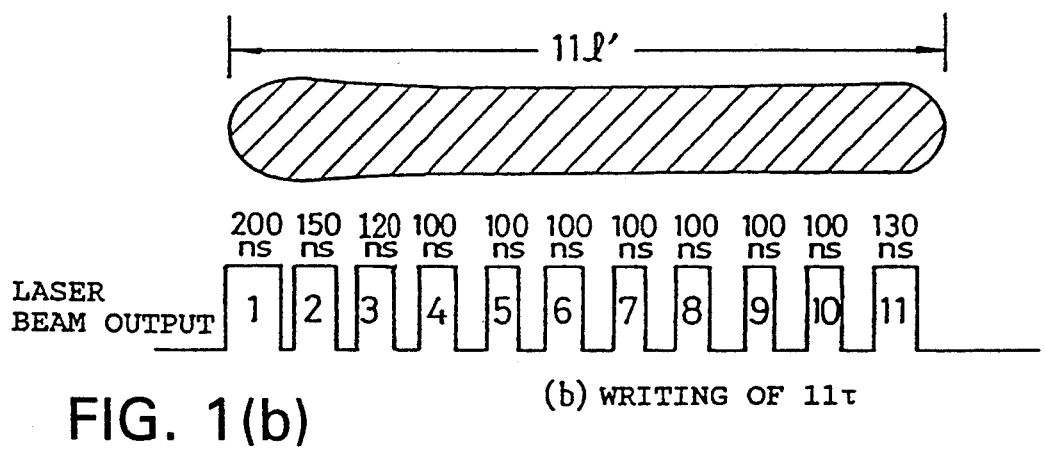
FIG. 1(b) (b) WRITING OF 11τ
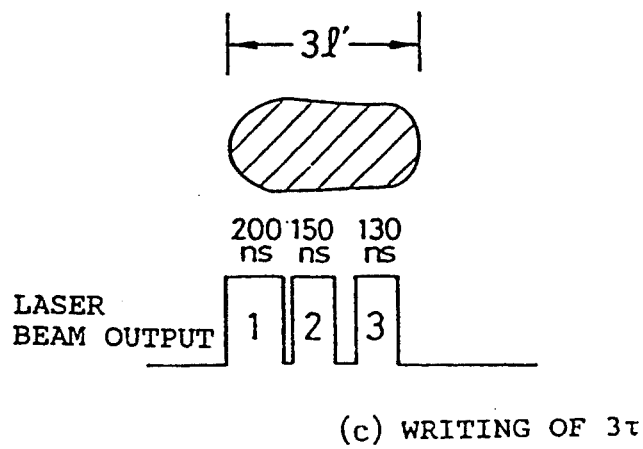
(c) WRITING OF 3τ
FIG. 1(c)

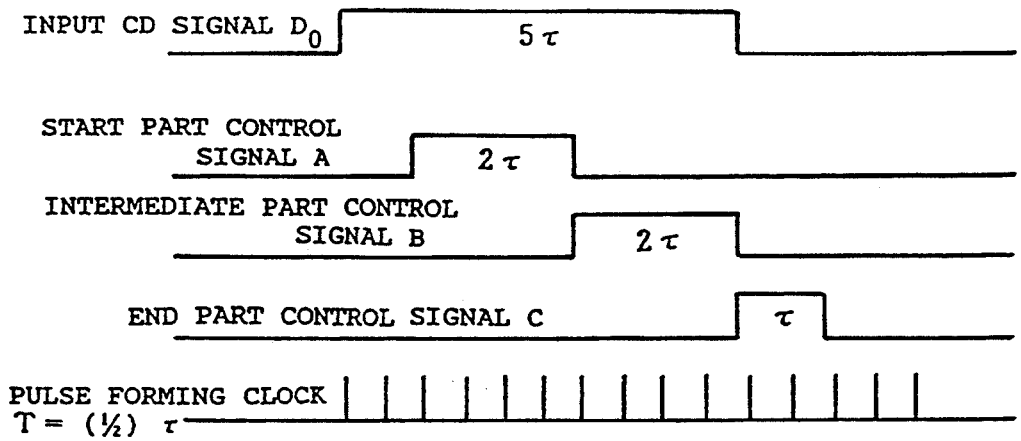
FIG. 11(a)
PULSE PROHIBITION MEANS
   (X REPRESENTS
      "PROHIBITION")  START PART ch1   × × ○ ○
                                  ch2   ○ ○ × ×
              INTERMEDIATE PART ch1   ○ ○ ○ ○ ○ ○ ○ ○ ○ ○ ○ ○ ○ ○ ○ ○
                                  ch2   × × × × × × × × × × × × × × × ×
                    END PART ch1   ○ ×
                                  ch2   × ×
FIG. 11(b)
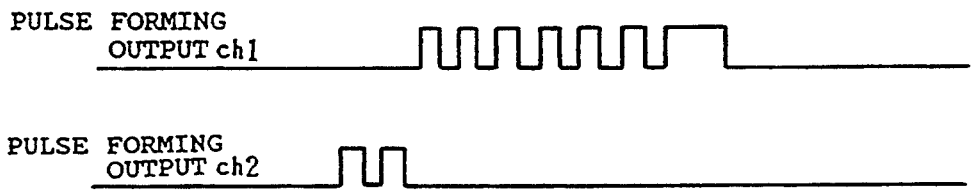
FIG. 11(c)
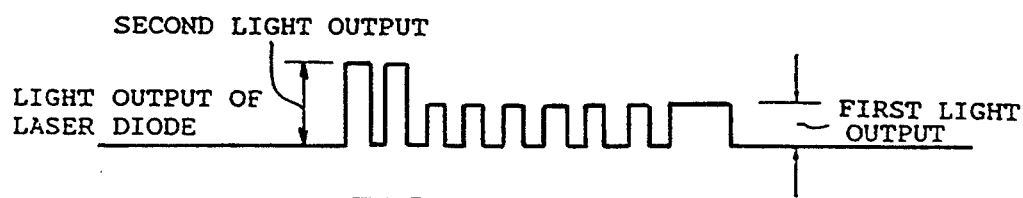
FIG. 11(d)

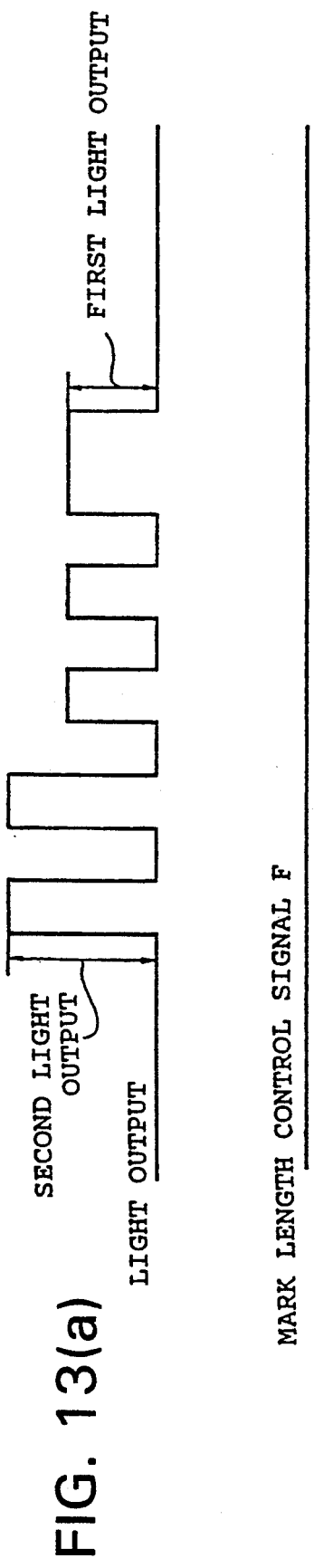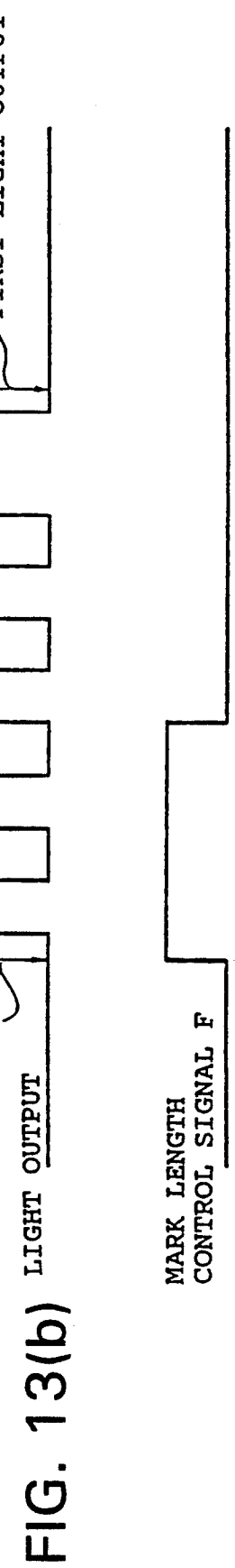

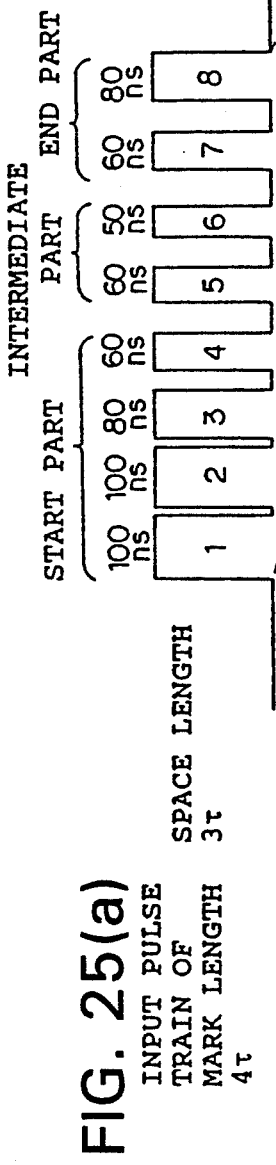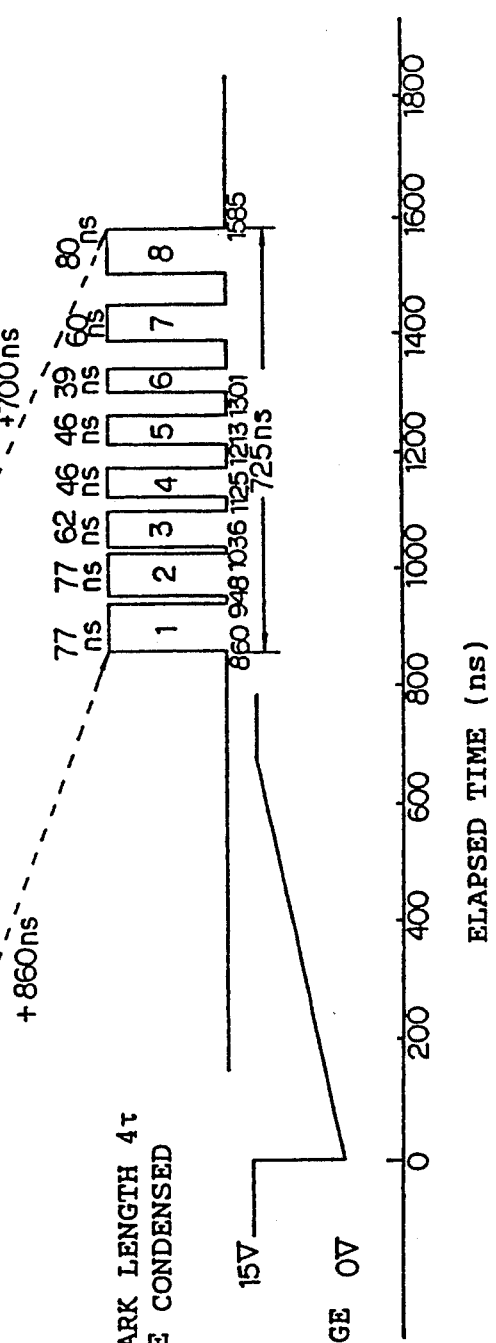

PITS WRITTEN ON MEDIUM

NORMAL SHAPE OF A WRITTEN PIT

ABNORMAL SHAPE OF A WRITTEN PIT

WRITE CONTROL METHOD AND APPARATUS FOR WRITING OPTICAL DISK DATA

This application is a continuation of application Ser. No. 07/492,899, filed Mar. 13, 1990, now abandoned.

FIELD OF THE INVENTION

The present invention relates in general to a write control method and apparatus for writing optical disk data, and in particular to a write control method and apparatus for accurately writing optical disk data by means of a laser beam.

In recent years, as mass storage computer systems have been developed, optical disks such as magneto-optical disks, phase-change optical disks and the like are becoming increasingly important as an erasable mass storage file. For this reason, an optical disk apparatus has been developed which records mass document data or image data onto a medium in the form of an optical disk.

Data recording in the optical disk medium is performed by inverting the magnetization of the disk medium or changing the crystalline state of the disk medium, with the aid of thermal effect by the irradiation of a laser beam onto the disk medium. Among recording methods, particularly in a so-called mark-length recording in which the lengths of a written signal (for example, laser irradiation) and an unwritten signal (for example, laser non-irradiation) represent data, it is very important to write an accurate signal shape onto a medium in order to reduce reading errors and enhance the reliability of the apparatus.

It should here be noted that the signal recorded on a disk medium is generally called a "bit, mark, or pit". In a rewritable optical disk medium such as a magneto-optical disk, although a signal written by laser irradiation does not make a dent in the disk medium, the written signal will hereinafter be referred to as a "pit", according to the custom of the optical technology. In addition, an electric signal which corresponds to the length of the pit will hereinafter be referred to as a "mark".

The present invention will be described specifically in relation to an optical disk of the mark-length recording type. Although the magneto-optical disk presently in use is generally of the bit-position recoding type and not of the mark-length recoding type, the magneto-optical disk is thought to shift to the mark-length recoding type in the near future, when the bit density doubles. The present invention can also be applied to the magneto-optical disk by the use of the mark-length recording. As the magneto-optical recoding medium, rare earth-transition metals such as TbFeCo may be used. In addition, as the magneto-optical disk, magneto-optical recording film of TbFeCo is protected by upper and/or lower protecting film of such as $SiO_2$, SiN ... or rare-earth metal and transparent dielectric material such, for example, as $Tb+SiO_2$, $Tb+ZnS$, $Tb+MgF_2$, $Tb+SiN$, and $Tb+TiC$ in order to prevent or inhibit oxidation of the magneto-optical recording medium.

DESCRIPTION OF THE PRIOR ART

FIG. 30 is used to explain a compact disk signal (hereinafter referred to as a "CD signal") as an example of the mark-length recording. In this example, High ("H") and Low ("L") signals have lengths of $3\tau$ to $11\tau$ ($\tau$ represents a unit cycle = 230 ns), and these lengths represent data.

In a conventional optical disk apparatus, the writing is performed by a method wherein a laser beam is irradiated only for a period of $5\tau$ (230 ns $\times$ 5 = 1150 ns) for the High signal and not irradiated for the Low signal.

In that case, since the medium is rotating at a constant speed, the pulse width $n\tau$ of the write data is converted to nl (l: a unit length on a medium corresponding to a time $\tau$) which is a pit length on the medium, and recorded. The written pits are shown in FIGS. 31(a) and 31(b).

However, in the above described conventional method and apparatus for writing optical disk data, if the rotating speed of the medium is decreased in order to perform higher density data recording, the pit shape as shown in FIG. 31(c) will be written for a longer pit such as $n \geq 7$, due to the influence of the heat that is generated when the pit is written. Consequently, the carrier-to-noise ratio (CNR) is deteriorated in reading data, and reading error arises.

In order to overcome the problem, it has been proposed to intermittently apply a laser beam corresponding to the High signal. The method has been described, for example, in Japanese patent "KOKAI" publication Nos. 63-160017, 63-263632, 62-229542, 63-266632, 63-153726 and 63-266633.

However, in the above described method, deterioration of the CNR at the time the rotating speed of the medium is decreased cannot be reduced by less than a certain degree.

That is to say, if the rotating speed of the medium is decreased, then the influence of the remaining heat from the previous pit writing as well as the heat generated during pit writing becomes large. Therefore, the write starting position of the pit varies depending upon the length of the space between the pits (space length after the previously written pit). Consequently, there is a variation in the length of the written pit.

Although the above described method can overcome the problem associated with the heat generated during pit writing, it cannot overcome the problem associated with the remaining heat from the previous pit writing. Thus, a need exists for preventing the deterioration of the CNR at the time of high density data writing.

In addition, there is a technique for preventing the problem associated with the remaining heat from the previous pit writing, which is described, for example, in Japanese patent "KOKAI" publication Nos. 63-269321, 63-302424 and 64-59633.

However, the technique described in the above publications cannot solve the problems to be solved by the present invention, as will be described below.

The techniques of the above described publications will hereinafter be described in detail.

1) Japanese patent "KOKAI" publication No. 63-160017

This apparatus is constructed such that means for controlling laser light divides laser light into a plurality of pulses and applies the pulses within a time corresponding to the length of a signal pit. The laser light controlling means divides the laser light in accordance with the length of the signal pit, makes the width of each leading pulse of the divided laser pulses wider than the widths of the succeeding pulses, and further makes the intensity of each leading pulse of the divided laser pulses larger than the intensities of the succeeding pulses.

Thus, the publication describes in relation to the writing that is performed by the laser light in the form of pulse, but it does not disclose a concrete pulse forming means and therefore cannot overcome the aforesaid problems.

2) Japanese patent "KOKAI" publication No. 63-263632

This apparatus is constructed such that means for controlling laser light divides laser light into two pulses immediately before the laser irradiation duration is completed, and applies the two pulses within a time corresponding to the length of a signal pit. Although the apparatus is structurally simpler than that of the above publication No. 63-160017 it cannot solve the aforesaid problems, for the same reasons described above.

3) Japanese patent "KOKAI" publication No. 62-229542

This apparatus includes a pulse generator for generating at constant cycles a pulse which has a predetermined pulse width corresponding to the light beam irradiation time that is suited to the recording sensibility of a recording layer, and includes a gate circuit for controlling transmission of the pulse signal from the pulse generator to a laser drive circuit, according to a record pulse outputted from a record pulse generator. The laser drive circuit controls the light output of a laser light source by means of the output of the gate circuit.

However, the apparatus relates to means for converting CD signals to pulse signals. Moreover, the pulse width is constant and can not be varied within the record pulse.

4) Japanese patent "KOKAI" publication No. 63-266632

In the recording method for recording data by means of a change in the atomic arrangement of a recording medium that is caused by irradiating an energy beam such as a light, electron beam and the like, a record point is formed with one or more pulses having a pulse width that is shorter than the length of time the center of the energy spot passes from one end of the record point to the other. However, the publication describes only that the writing is performed by the laser beam in the form of a pulse, and the pulse width is preferably shorter than $\frac{3}{4}$ of a pit length, more preferable if shorter than $\frac{1}{2}$, and most preferable if shorter than $\frac{1}{4}$. No description is made in relation to pulse forming means.

5) Japanese patent "KOKAI" publication No. 63-153726

It is described that the energy amount of each radiation pulse of a series of radiation pulses is determined by the pulse position in the pulses, considering the condition that the sum of the temperature rise in a data body caused by one radiation pulse and the temperature that has already been generated by the previous radiation pulses of the series of radiation pulses is always constant. This is a patent application that has been filed by the co-authors of a thesis cited in the specification of the present application, and is almost identical with the thesis, and cannot solve the above described problems, as will hereinafter be described in detail.

6) Japanese patent "KOKAI" publication No. 63-266633

This publication discloses that a write signal pulse is divided into three parts of a start part, an intermediate part and an end part. However, the publication does not disclose means for setting each pulse width of each part independently, and pulse prohibition means for prohibiting generation of each pulse independently. As will be described hereinafter, the method disclosed in this publication is not suitable to obtain an optimum written pit shape, and cannot completely resolve the above described problems. In addition, no description is made in relation to means for controlling the length of a write signal in accordance with a space length immediately before the write signal, which means is one of the major elements of the present invention.

7) Japanese patent "KOKAI" publication No. 63-269321

The apparatus disclosed herein is characterized in that its laser light control mechanism shortens a laser light irradiation time, when a longer pit is written, or shortens the laser light irradiation time, when a blank space length forms a shorter pit. In that case the mechanism of the pit formation is based on ablation of films, and therefore is applied to write-once type disks for archival purposes. Moreover, no description is made in relation to concrete means to shorten the laser light irradiation time, when a blank length forms a shorter pit. Further, the method disclosed in this publication is for normal writing, and no description is made in relation to pulse forming means. Therefore, this publication does not suggest a concrete technique to solve the above described problems.

8) Japanese patent "KOKAI" publication No. 63-302424

The apparatus disclosed herein is characterized in that the laser light control means shortens a laser light irradiation time, when a blank length forms a shorter pit, and advances the irradiation time, when a blank length forms a longer pit. This technique is almost the same as that of the above publication No. 63-269321, and no description is made in relation to pulse forming means and a concrete technique to solve the above described problems.

9) Japanese patent "KOKAI" publication No. 64-59633

In the optical disk apparatus of pit position recording, in order to avoid the phenomenon that, when a write space is short, the diameter of the succeeding pit will become large, the write space is detected, and if the space is short, the write laser power is then reduced. It is disclosed that the pulse space is detected and the amount of the laser light is varied according to the detected pulse space. However, this publication is a pit position recording and not a mark length recording, and therefore is entirely different in recording process from the present invention. Therefore, as in the publication Nos. 63-269321 and 63-302424, the problems described above cannot be solved.

SUMMARY OF THE INVENTION

Accordingly, it is an object of the present invention to provide an improved write control method and apparatus for writing optical disk data which are capable of maintaining an accurate pit shape even when high density data recording is performed, in order to obtain regenerative signals of better CNR (carrier-to-noise ratio).

In order to achieve the above object, the influence of the remaining heat from the previous pit writing as well as the heat generated during pit writing is effectively corrected in accordance with the present invention.

In accordance with one important aspect of the present invention, there is provided a write control method for writing optical disk data wherein pits are written by a write signal composed of mark signal parts and space signal parts, and a length of each pit represents the optical disk data, comprising the steps of: converting the mark signal parts to pulses and generating a series of pulse trains which correspond to lengths of the mark signal parts, respectively; controlling a length and/or amplitude of each of the pulse trains in accordance with a length of the space signal part immediately before the mark signal part; and applying successively the controlled pulse trains to laser irradiation means so that the pits are written.

In addition, in a write control method for writing optical disk data wherein pits are written on a medium by a write signal composed of mark signal parts and space signal parts, and a length of each pit represents the optical disk data, the write control method comprises the step of dividing each of the mark signal parts into three parts of (a) a start part which elevates a temperature of the medium rapidly to a writable temperature, (b) an intermediate part which maintains a balance between the elevated temperature of the medium and heat radiation from the medium, and (c) an end part which maintains a temperature fall resulting from the completion of a laser beam irradiation at a predetermined condition. The three part of each mark signal part to pulses is converted so that each pulse width of the three parts becomes a favorable condition. Then, a series of pulse trains which correspond to lengths of the mark signal parts is generated. If the length of the mark signal part is varied, varying the number of pulses of the intermediate part of the mark signal part is varied. The write control method further comprises the steps of controlling a length and/or amplitude of each of the pulse trains in accordance with a length of the space signal part immediately before the mark signal part, and applying successively the controlled pulse trains to laser irradiation means so that the pits are written on the medium.

In addition, in a write control method for writing optical disk data wherein pits are written by a write signal composed of mark signal parts and space signal parts, and a length of each pit represents the optical disk data, the write control method comprises the step of converting the mark signal parts to pulses and generating a series of pulse trains which correspond to lengths of the mark signal parts, respectively. The write control method further comprises the step of time condensing a part or whole of each pulse train in accordance with a length of the space signal part immediately before the mark signal part in such a manner that a position of an end pulse of each pulse train becomes the same position. The write control method further comprises the step of applying successively the time condensed pulse trains to laser irradiation means so that the pits are written.

In addition, in a write control apparatus for writing optical disk data wherein pits are written on an optical disk medium by laser irradiation means in accordance with a write signal composed of mark signal parts and space signal parts, and a length of each pit represents the optical disk data, the write control apparatus comprises first delay means for delaying with a first predetermined range each of the mark signal parts, and second delay means for further delaying the each of the mark signal parts delayed by the first delay means with a second predetermined range. The write control apparatus further comprises control signal generating means for generating a start part control signal, an intermediate part control signal and an end part control signal from outputs of the first and second delay means. The write control apparatus further comprises pulse forming means for dividing each of the mark signal parts into three parts of a start part which elevates a temperature of the medium rapidly to a writable temperature, an intermediate part which maintains a balance between the elevated temperature of the medium and heat radiation from the medium, and an end part which maintains a temperature fall resulting from the completion of a laser beam irradiation at a predetermined condition, and for converting the three parts of each mark signal part and generating a series of pulse trains which correspond to lengths of the mark signal parts, respectively. The write control apparatus further comprises pulse train control means for controlling a length and/or amplitude of each of the pulse trains in accordance with a length of the space signal part immediately before the mark signal part.

In addition, in a write control apparatus for writing optical disk data wherein pits are written on an optical disk medium by laser irradiation means in accordance with a write signal composed of mark signal parts and space signal parts, and a length of each pit represents the optical disk data, the write control apparatus comprises pulse forming means for converting the mark signal parts to pulses and generating a series of pulse trains which correspond to lengths of the mark signal parts, respectively; space recognition means for recognizing a length of the space signal part immediately before the mark signal part; and time condensation means for time condensing a part or whole of each pulse train in accordance with the recognition result obtained from the space recognition means in such a manner that a position of an end pulse of the pulse train becomes the same position.

BRIEF DESCRIPTION OF THE DRAWINGS

The above and other objects and advantages will become apparent from the following detailed description when read in conjunction with the accompanying drawings wherein:

FIGS. 1 (a)-1(c) are diagrams illustrating a favorable write pulse condition and pit shape in order to explain the principles of the present invention;

FIGS. 11(a)-11(d) are timing diagrams of the third embodiment;

FIGS. 13(a) and 13(b) are timing diagrams used to control a light output of the fourth embodiment;

FIGS. 25(a)-25(c) are diagrams showing an output pulse train in which the correction of remaining heat by a time condensation of the seventh embodiment has been performed;

DESCRIPTION OF THE PREFERRED EMBODIMENTS

The present invention will hereinafter be described in accordance with the accompanying drawings.

First, the inventors have studied in respect of an accurate analysis of the problems mentioned above and means to solve the problems.

The above described first problem that the shape of pits cannot be written accurately if the rotational speed of the medium is made slower in order to perform high density data recording, can be explained as follows. If the rotational speed of the medium is a normal rotational speed, the local temperature rise of the medium by laser beam irradiation and the temperature fall of the medium by heat radiation are maintained at a fixed balance, and a boundary where the writing by thermal effect is performed (hereinafter referred to as a "write boundary") is almost consistent with the diameter of the laser beam. Therefore, if a pit of 11τ is written by the laser beam, a pit 11 l in length and d (d: diameter of laser beam) in width will be formed on the medium.

If, on the other hand, the rotational speed of the medium is made slower for the high density data recording, then a laser beam irradiation energy per unit area becomes large. Consequently, the temperature fall by heat radiation becomes insufficient, and as the irradiation time becomes longer, heat is gradually accumulated and flows into the positions before and after the beam irradiation position. The energy of the laser beam necessary to perform a writing for a fixed time with the aid of the thermal effect has a lower limit. Therefore, for example, when the rotational speed is reduced to ½, the writing cannot be performed with the laser beam energy reduced to ½, and consequently the first problem described above arises at all times.

Figure 31A:
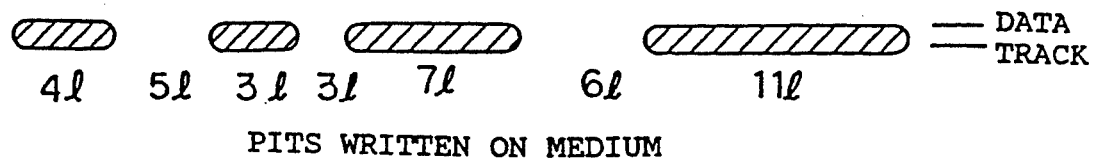
FIGS. 31(a)-(c) illustrate pits that have been written by a conventional method.
Figure 31B:
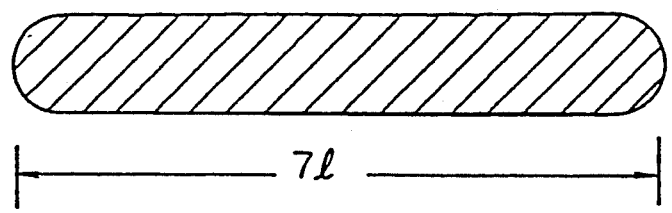
Figure 31C:
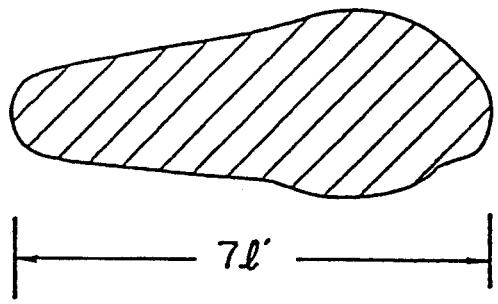

Therefore, if a longer pit such as 7τ or more is written, the accumulation of heat becomes larger as the laser beam is advanced to the 2 l' position, 3 l' position and to 4 l' position of the pit length 7 l' of FIG. 31(c). As a result, the influence of heat upon the adjacent positions is gradually increased, and the aforesaid write boundary is also enlarged beyond the laser beam diameter d. Since in the vicinity of the pit end (in the above example, 7 l position) the laser beam irradiation is completed immediately after the pit end, and the temperature fall by heat radiation becomes dominant, the write boundary becomes almost the beam diameter.

Therefore, in the above example, the pit shape as shown in FIG. 31(c) will be formed. Particularly, in a phase-change type medium which performs a recording by varying a reflectivity by means of a change of a crystalline state (crystalline phase), the crystalline state is changed by quenching or annealing from a molten state in order to write High and Low data. Therefore, in that case, the influence of the heat transferred from the neighboring positions becomes extremely large.

As an example, consider a medium of the phase change type which writes High data by quenching. If a written pit becomes longer (for example, 7τ or more) and therefore there is the influence of heat upon the adjacent position, then a 3τ position is subjected to the influence of the heat from a 4τ position, and the 4τ position is subjected to the influence of the heat from a 5τ position. Thus, a nτ position will be subjected to the influence of the heat from a (n+1)τ position and consequently the cooling is performed not by quenching but by annealing. Therefore, High data writing of such a longer pit becomes extremely unstable. In order that a stable High data writing state is obtained even in the case of the writing of longer pits, that is, in order that a stable rapid cooling state is achieved, it is effective that a laser beam is intermittently irradiated over the length of a pit nτ (n=3 to 11). As to this, a writing by a pulse train having a width of 80 ns at a frequency of 4.3 MHz (τ=230 ns) is described in the "Phase-change optical data storage in GaSb" of APPLIED OPTICS (Vol. 26, No. 22 /Nov. 15, 1987).

The inventors of this application have written a variety of High pit lengths (hereinafter referred to as "mark lengths") on a medium in accordance with the examples of the above described "Phase-change optical data storage in GaSb" and investigated the shape of the written pits. As a result, as described in the above publication, in the writing by a pulse train having a fixed pulse width, the pulse width conditions in which a favorable pit shape is obtained for mark lengths $3\tau$ to $11\tau$ cold not be found even by varying the pulse width or light power. For the shortest mark length of $3\tau$, a favorable pit shape was obtained when the writing was performed with three pulses of 180 ns pulse width. However, if the longest mark length of $11\tau$ is written with 11 pulses of this condition, the same abnormality of the pit shape as the writing by successive lights mentioned in the prior art has occurred, since the light energy is extremely large.

On the other hand, at the condition of 120 ns pulse width which provides a favorable pit shape in the case of $11\tau$, the pit of $3\tau$ could not be written normally because of the insufficient light energy.

As previously described, the recording method in which the pulse width of the above described pulse train representing the mark length is changed is described in the Japanese "KOKAI" publication No. 63-266633. In this method, the pulse train is divided into three parts of a start part, an intermediate part and an end part, and the pulse widths of the start part and end part are wider than the pulse width of the intermediate part. However, in this method, if each part of the start part, intermediate part and end part is constituted by a plurality of pulses, then the pulse widths of the pulses of each part cannot be set individually. Therefore, the method is not suited for the purpose that an optimum written pit shape is obtained under the combination of various pulse widths.

Hence, the inventors have made an apparatus which is capable of setting independently each pulse width of a pulse train forming the mark described above, as will hereinafter be described. A variety of mark lengths were written under the combination of various pulse widths in order to observe the shape of the written pits.

FIGS. 1(a)-1(c) illustrate pits which have been written with favorable write pulse conditions obtained from the above observations. FIG. 1(a) illustrates a pit shape which has been written with a pulse cycle $T=\tau$ (230 ns), a first pulse width 200 ns and a second pulse width 150 ns (start part), a third pulse width 120 ns and fourth-sixth pulse widths 100 ns (intermediate part), and a seventh pulse width 130 ns (end part), by using an input signal having High data of $7\tau$ (mark) and Low data of $7\tau$ (space). The written pit shape has been much improved, as compared with that shown in FIG. 31(c) which has been obtained with the writing by a continuous laser beam. FIG. 1(b) illustrates a pit shape which has been written with a first pulse width 200 ns and a second pulse width 150 ns (start part), a third pulse width 120 ns and fourth-tenth pulse widths 100 ns (intermediate part), and an eleventh pulse width 130 ns (end part), by using an input signal having High data of $11\tau$ (mark) and Low data of $7\tau$ (space). Likewise, FIG. 1(c) illustrates a pit shape which has been written with a first pulse width 200 ns and a second pulse width 150 ns (start part), and a third pulse width 130 ns (end part, in this case there is no pulse for an intermediate part), by using an input signal having High data of $3\tau$ (mark) and Low data of $7\tau$ (space). In both the cases, a favorable pit shape is obtained as in the case of FIG. 1(a).

It turns out from the experimental result that the pulses include of (1) a part (start part) which elevates the medium rapidly to a writable temperature, (2) a part (intermediate part) which maintains a balance between the elevated temperature in the start part and the heat radiation from the medium, and (3) a part (end part) which maintains the temperature fall resulting from the completion of the laser beam irradiation at favorable conditions. Therefore, increasing or decreasing the pulses of the intermediate part to change the length of the intermediate part in accordance with a change of the mark length is merely to change the length of the part having a function of maintaining temperature. It follows from this that a favorable pit shape is obtained independently of the mark length.

Note that, with respect to the intermediate part pulse, a more favorable pit shape is obtained if the pulse width of the leading pulse is wider than the pulse widths of the other pulses, as shown in FIGS. 1(a) and 1(b).

In the experiments described above, only the mark length has been observed, and the space length has been assumed constant for convenience. However, in an actual CD signal, data are recorded by the combination of marks and spaces having lengths of $3\tau$ to $11\tau$. Therefore, after a mark has been written, a space between the mark and the next mark always varies between $3\tau$ and $11\tau$. Particularly, in the phase-change type medium which performs a recording by changing the crystalline state by means of quenching or annealing of the medium, the influence of the remaining heat from the previous pit becomes very important.

Figure 32:
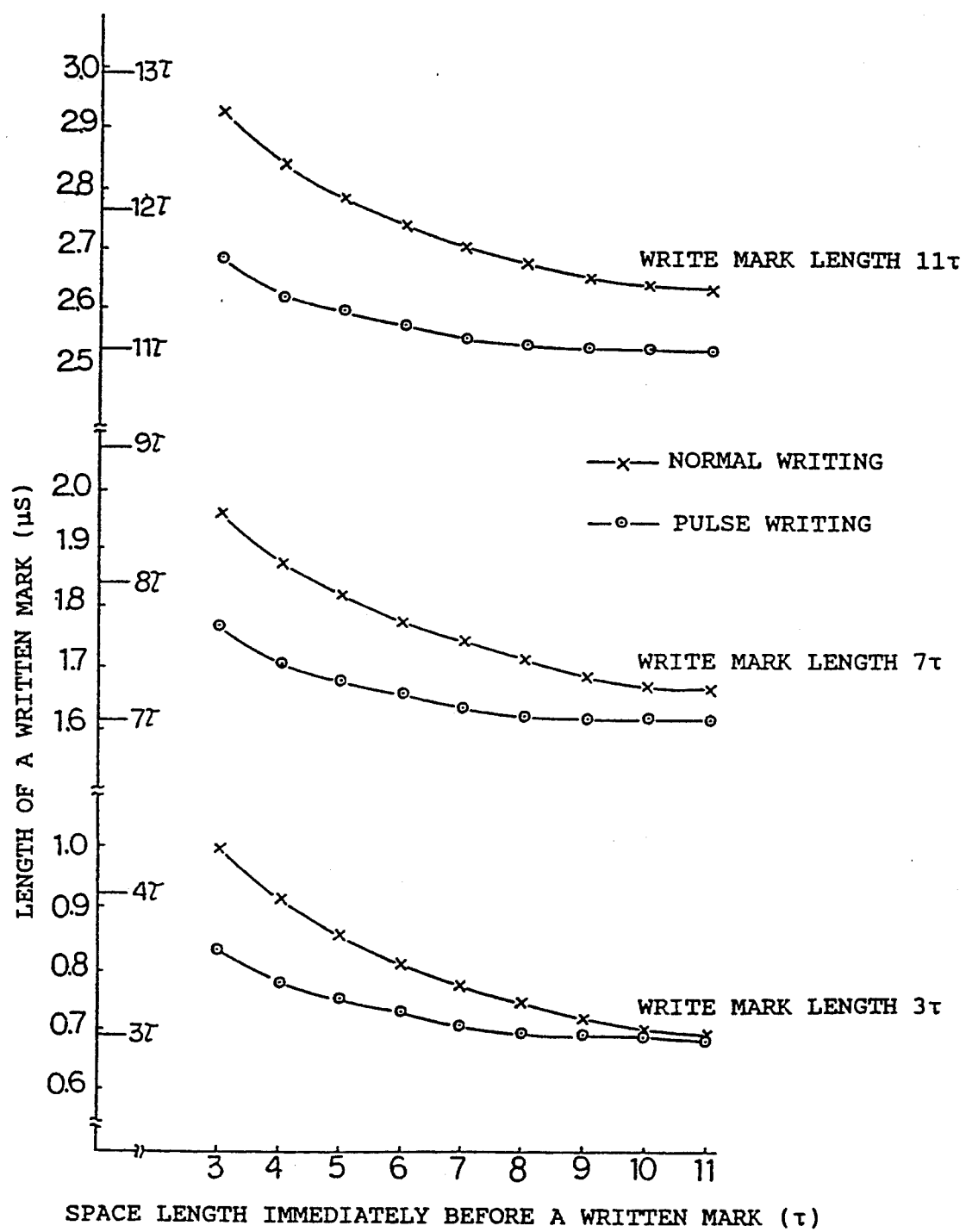
FIG. 32 is a diagram showing how the length of a written pit depends upon the length of a space immediately before the written pit.

In order to analyze the influence of the remaining heat, changes of the mark length were measured by varying the space length from $3\tau$ to $11\tau$. The test results are shown in FIG. 32.

The test medium was covered with a recording film of 60 nm having a composition of $(In_{0.40}Sb_{0.60})_{0.94}Ge_{0.06}$ and tested at a line speed of 1.2 m/s. The test results of the written mark lengths $3\tau$, $7\tau$ and $11\tau$ are shown with the space length immediately before the written mark in $\tau$ taken on the abscissa and with the written mark length in $\mu s$ taken on the ordinate. In FIG. 32, "x" represents data when a normal writing (laser power 5 mW) was performed without converting an input CD signal into pulses, and "o" represents data when an input CD signal was converted into pulses at the favorable pulse conditions described above (laser power 12 mW).

In the normal writing the difference between the written mark lengths has reached 300 ns (corresponding to $1.3\tau$) with respect to the space lengths $3\tau$ and $11\tau$, and consequently it is impossible to determine the written mark length accurately.

In the pulse writing the difference between the written mark lengths is 150 ns (corresponding to $0.65\tau$) with respect to the space lengths $3\tau$ and $11\tau$, and this writing has been certainly improved. However, since this value is 65% of $\tau(=230$ ns) and exceeds $0.5\tau$ which is a discriminant reference of each mark length during readout, all of the mark lengths cannot be discriminated accurately.

Thus, because the influence of the remaining heat is extremely large, the mere pulse formation based on the conventional methods described above cannot accurately write and read an actual mark-length record signal such as a CD signal.

Embodiments to be described hereinafter are those which provide a write control method and apparatus for writing optical disk data which are capable of overcoming the problems described above, writing accurately mark-length record signals such as CD signals, and obtaining regenerative signals of better CNR and high quality.

First Embodiment

Figure 2:
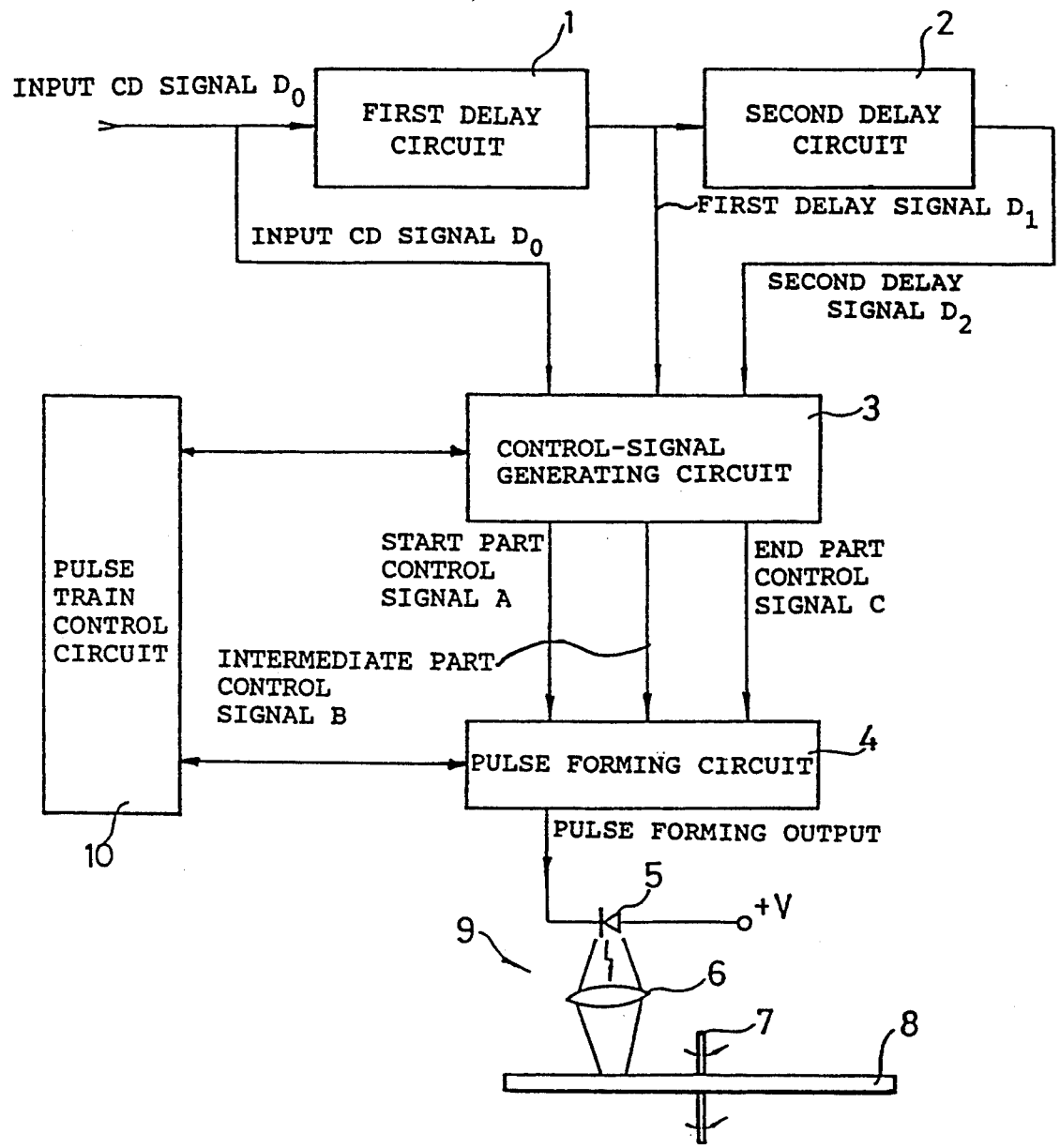
FIG. 2 shows the structure of a write control apparatus for writing optical disk data according to a first embodiment of the present invention.

Referring now in greater detail to the drawings and initially to FIGS. 2 through 7, there is shown a first embodiment of a write control method and apparatus for writing optical disk data according to the present invention. FIG. 2 is used to show the structure of the write control apparatus for writing optical disk data. In FIG. 2, the write control apparatus comprises a first delay circuit (first delay means) to which an input CD signal $D_0$ (corresponding to a write signal of a record pit) is inputted and in which the input CD (compact disk) signal $D_0$ is delayed with a predetermined range, and a second delay circuit (second delay means) 2 in which a CD signal (first delay signal $D_1$) delayed in the first delay circuit 1 is further delayed with a predetermined range. The write control apparatus further comprises a control-signal generating circuit 3 which generates a start part control signal A, intermediate part control signal B and end part control signal C from the output signals of the first and second delay circuits 1 and 2 (first and second delay signals $D_1$ and $D_2$). The write control apparatus further comprises a pulse forming circuit (pulse forming means) 4 which divides the write signal of the record pit (i.e., input CD signal $D_0$) into a start part, intermediate part and end part in response to the control signals A, B and C and which generates pulses respectively corresponding to the three parts. A pulse train control circuit (pulse train control means) 10 detects a space length immediately before the input CD signal $D_0$ and controls the length of a pulse train according to the space length in the control apparatus.

A pulse forming output from the above described pulse forming circuit 4 is inputted to a laser diode 5, which generates a laser beam in response to the pulse forming output. The laser beam is focused through a lens 6 and irradiated on an optical disk medium 8 rotating about its rotational axis 7 so that a mark-length recording will be performed. The laser diode 5 and lens 6 as a whole constitute laser irradiation means 9.

The first delay circuit 1 and second delay circuit 2 are preferably constituted by digital means such as a shift register in which a delay synchronized to a clock is obtained, but they may also be constituted by analog means such as a delay line. In addition, while it will be described that in this embodiment a first delay time and a second delay time are $\tau$ and $2\tau$, respectively, it is noted that the delay times may also be, for example, $1.5\tau$ or $0.25\tau$ as long as they are below a minimum space length ($3\tau$ for a CD signal) determined by a signal standard.

Figure 3:
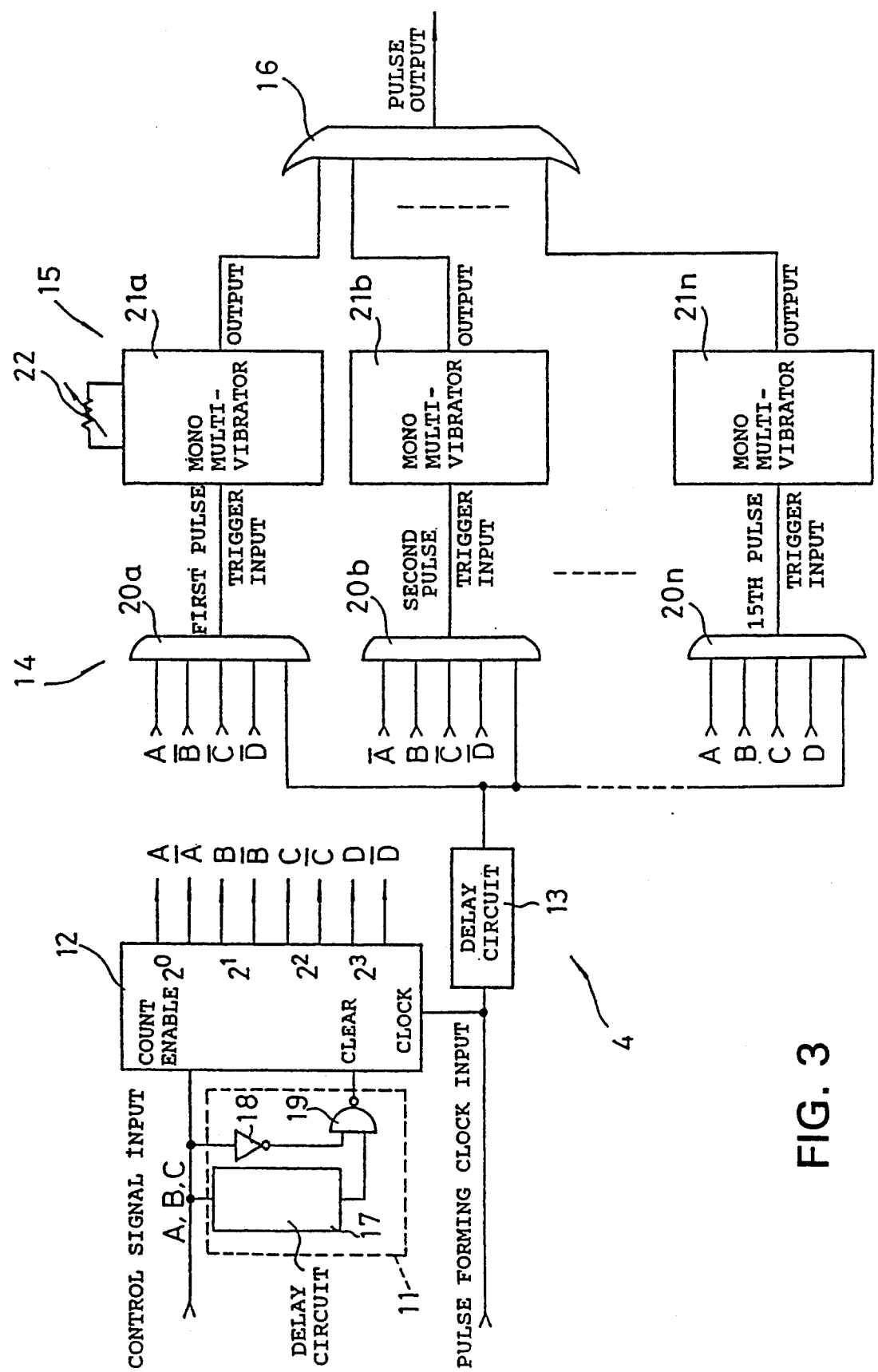
FIG. 3 shows the structure of the pulse forming circuit of FIG. 2.

FIG. 3 is used to explain the structure of the pulse forming circuit 4. Although only one pulse forming circuit 4 is shown in FIG. 3 for convenience, each part of the start part, intermediate part and end part requires the circuit shown in FIG. 3.

In FIG. 3, the pulse forming circuit 4 is constituted by a clear circuit 11, a counter 12, a delay circuit 13, a decode circuit 14, a pulse-width set circuit 15, and an OR gate 16 as an aggregate circuit. The clear circuit 11 includes a delay circuit 17, an inverter 18 and a NAND gate 19. The clear circuit 11 synchronizes with the fall edges of the control signals A, B and C and outputs a clear signal to the counter 12. The counter 12 has a clear terminal to which the clear signal is inputted, a count enable terminal to which each signal of the control signals A, B and C is inputted, and a clock terminal to which a pulse-forming clock signal is inputted. Assume now that the control signal A is first inputted to the counter 12. The counter 12 starts counting if the control signal A becomes "H" and stops counting if the signal A becomes "L". At this time, a clear pulse having pulse width which is determined by a delay time (for example, 50 ns) of the delay circuit 17 is inputted from the clear circuit 11 to the clear terminal of the counter 12, and resets the counter 12 to a "0" state.

Figure 4:
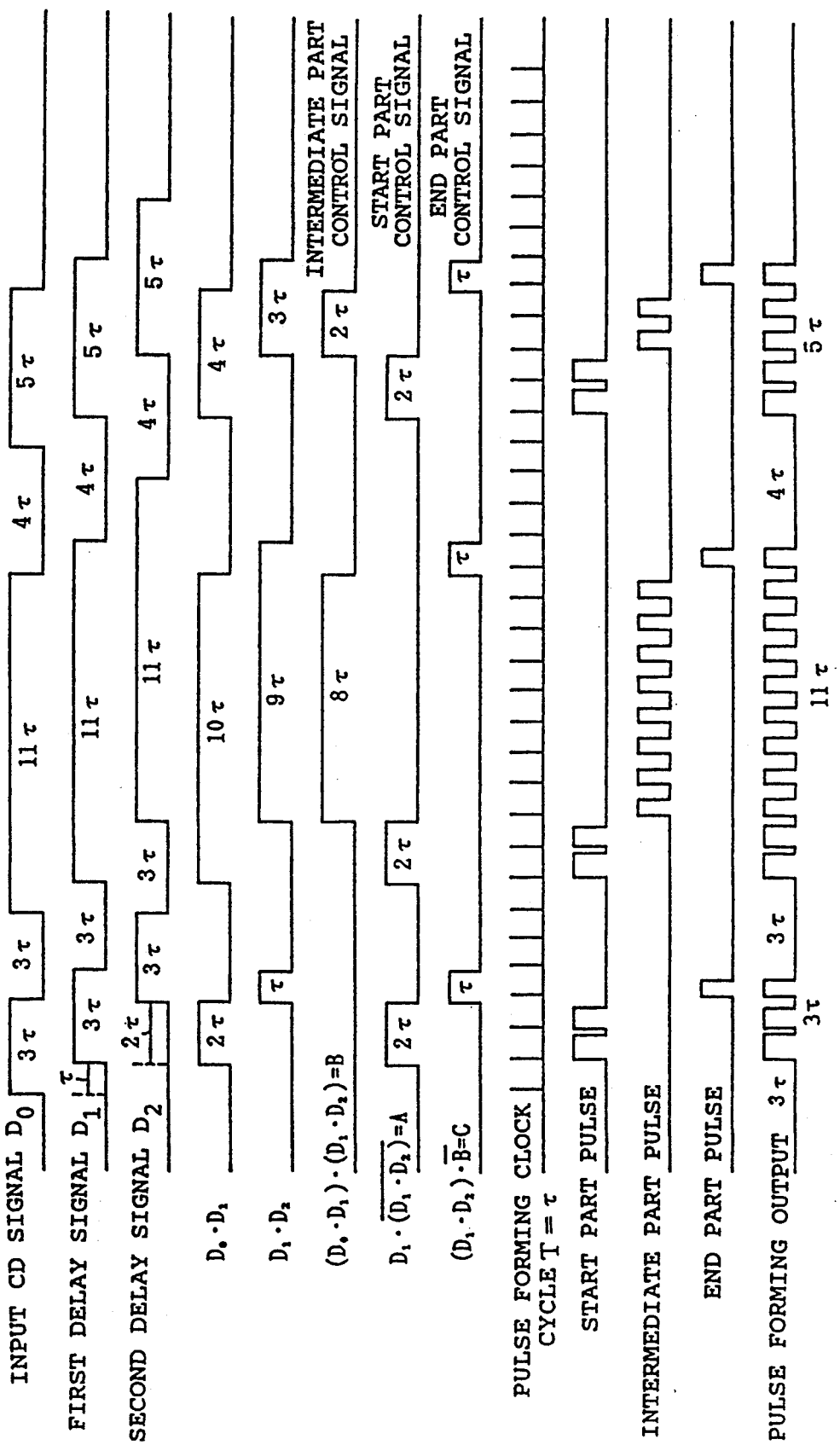
FIG. 4 is a timing diagram showing the basic operation of the first embodiment.

More specifically, if the control signal A with a pulse width of $2\tau$ shown in FIG. 4 is inputted, the state of the counter 12 then becomes $\rightarrow 1 \rightarrow 2 \rightarrow 0$. The $2^0$ position $(A,\overline{A})$, $2^1$ position $(B,\overline{B})$ and $2^2$ position $(C,\overline{C})$ and $2^3$ (D, $\overline{D}$) position that are the outputs of the counter 12 have been inputted to the decode circuit 14, which is constituted by, for example, AND gates $20a$ to $20n$ (in this embodiment, n=15). The reason that n=15 is that 15 pieces of "1" to "F" are used and "0" is not used.

In addition, the pulse-width set circuit 15 comprises monostable multivibrators $21a$ to $21n$ (in this embodiment, n=15). Each of these monostable multivibrators is provided with pulse-width adjustment means 22 such as a variable resistor, as shown in the monostable multivibrator $21a$. Therefore, it is possible to set independently each pulse width of first to nth pulses.

When the counter 12 is in the "0" state, A =B=C=D=0 and $\overline{A}=\overline{B}=\overline{C}=\overline{D}=1$, and there is no combination in which all of the inputs of the decode circuit 14 become "1". Consequently, no signals appear in the output sides of the decode circuit 14, since the output sides still remain "0". When, on the other hand, the state of the counter 12 is "1", $A=\overline{B}=\overline{C}=\overline{D}=1$ and $\overline{A}=B=C=D=0$. Consequently, a pulse forming clock that has been delayed (for example, 50 ns) appears only in the output side of the AND gate $20a$ having an input combination of $A \cdot \overline{B} \cdot \overline{C} \cdot \overline{D}$, and triggers the monostable multivibrator $21a$. Since, when the state of the counter 12 is "2" $B=\overline{A}=\overline{C}=\overline{D}=1$ and $\overline{B}=A=C=D=0$, a pulse forming signal appears only in the AND gate $20b$ and triggers the monostable multivibrator $21b$. In this way, if the state of the counter 12 becomes "3", "4", "5", . . . and "15" then the monostable multivibrators $21c, 21d, 21e, \ldots,$ and $21n$ are triggered. That is to say, the monostable multivibrators $21a$ to $21n$ generate a first pulse, second pulse, . . . , and nth pulse (n=15), respectively, which are to be generated by the start part control signal A. Note that, if, as shown in FIG. 4, the width of the start part control signal A is $2\tau$ and not changed, only two AND gates and two monostable multivibrators will be required.

The outputs of the monostable multivibrators $21a$ to $21n$ are logically synthesized in the OR gate 16 that is an aggregate circuit, which gate 16 then outputs a start part pulse in which a first pulse, second pulse, . . . , and nth pulse appear in succession on a time base. An intermediate part pulse and end part pulse are also produced and outputted in the same way as the start part pulse mentioned above. Moreover, the start part pulse, intermediate part pulse and end part pulse are logically synthesized by an aggregate circuit (not shown) and become a pulse forming output shown in the lowest end of FIG. 4. The pulse forming output is then applied to the laser diode 5.

The control-signal generating circuit and pulse train control circuit will hereinafter be described. The basic operation of the control-signal generating circuit is first explained in accordance with the timing diagram shown in FIG. 4.

The input CD signal $D_0$ passes through the first delay circuit 1 and becomes the first delay signal $D_1$, which signal $D_1$ passes through the second delay circuit 2 and becomes the second delay signal $D_2$. While it will be described that in this embodiment the first delay time is $\tau$ and the second delay time is $2\tau$ for convenience, it is noted that the delay times may also be $1.5\tau$ and $0.25\tau$ as long as they are below a minimum space length ($3\tau$ for a CD signal) defined by a signal standard.

In the control-signal generating circuit 3 to which the signals $D_0$, $D_1$ and $D_2$ have been inputted, a logical operation is performed and consequently control signals $A = \overline{D_1} \cdot (D_1 \cdot D_2)$, $B = (D_0 \cdot D_1) \cdot (D_1 \cdot D_2)$ and $C = (D_1 \cdot D_2) \cdot \overline{B}$ are formed. Note that "·" represents "AND (logical product)" and "—" represents "NOT (negation)". The control signals A, B and C become a start part control signal, intermediate part control signal and end part control signal, respectively. The timings of the control signals A, B and C with respect to the input CD signal $D_0$ are shown in FIG. 4. The pulse width of the start part control signal A is consistent with the second delay time (in the embodiment of FIG. 4, $2\tau$) of the second delay circuit 2, and the pulse width of the end part control signal C is consistent with the first delay time (in the embodiment of FIG. 4, $\tau$) of the first delay circuit 1. In addition, the pulse width of the intermediate part control signal B is consistent with a value which is obtained by subtracting the first and second delay times of the first and second delay circuits 1 and 2 from the pulse width of the input CD signal. These consistencies are naturally obtained from the above logical operation which is performed to form the control signals A, B and C. Therefore, the pulse width of the start part control signal A and/or pulse width of the end part control signal C can be varied by varying the second delay time of the second delay circuit 2 and/or first delay time of the first delay circuit 1.

As shown in FIG. 2, the control signals A, B and C are inputted to the pulse forming circuit 4, and converted into a pulse forming output which has pulses corresponding in width and number to the control signals A, B and C. On the basis of the pulse forming output, the diode 5 mentioned above is driven so that the mark-length recoding will be performed on the optical disk medium 8.

Figure 5:
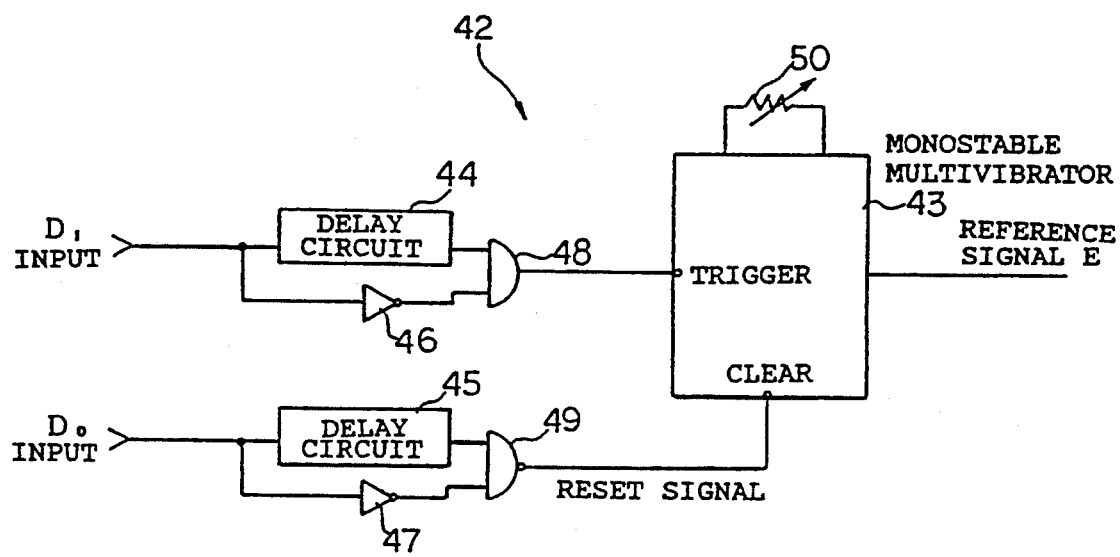
FIG. 5 shows the structure of a reference signal generating circuit of the first embodiment.
Figure 6:
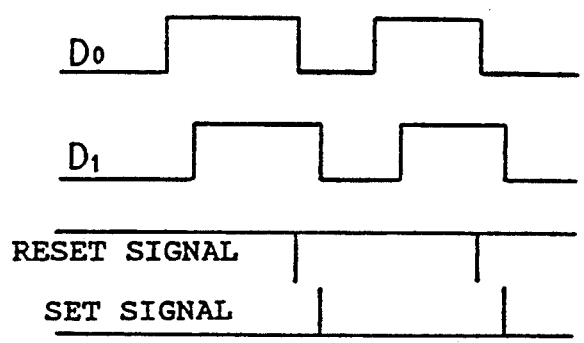
FIG. 6 is a timing diagram of the reference signal generating circuit.

Next, the operation of the pulse-train control circuit will be described in accordance with FIGS. 5-7. In the pulse-train control circuit 10, a reference signal is generated which reduces the mark length (ultimately, the length of the pulse train) if the space length is shorter than the length of the space signal. As shown in FIG. 5, a monostable multivibrator 43, delay circuits 44, 45, inverters 46, 47, AND gate 48 and NAND gate 49 constitute the pulse-train control circuit 10 or 42, which circuit 42 resets at the fall of the input CD signal $D_0$ and sets at the fall of the first delay signal $D_1$ delayed by $\tau$ than the $D_0$ signal, as shown in FIG. 6. The above reference signal E is generated from the pulse-train control circuit 42. In addition, the monostable multivibrator 43 is provided with pulse-width adjusting means such as a variable resistor 50. The adjusting means adjusts the length of the reference signal to $7\tau$.

Figure 7:
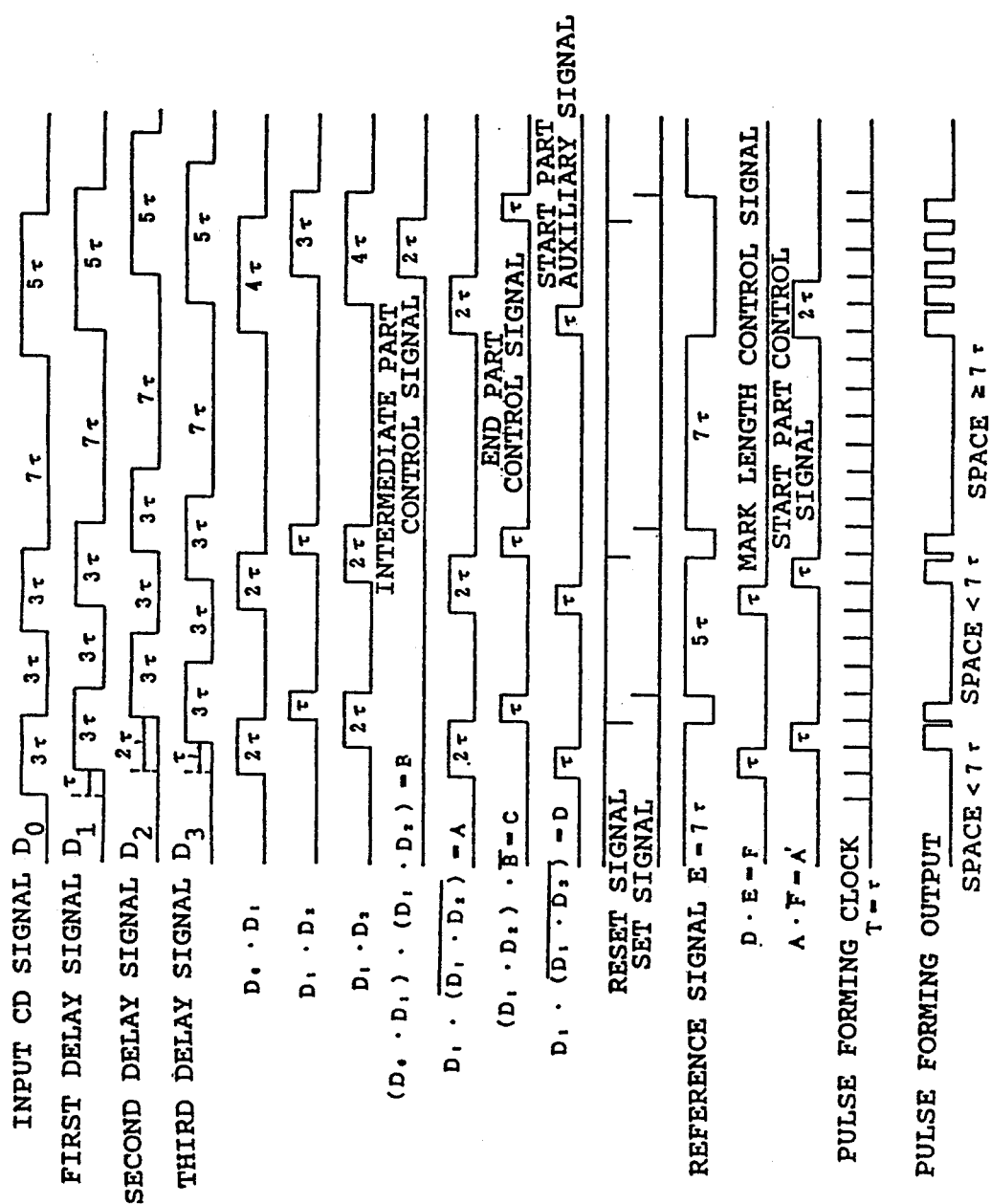
FIG. 7 is a timing diagram of a pulse train control circuit of the first embodiment.

FIG. 7 is used to explain a timing that is set by an input CD signal having a mark $3\tau$, space $3\tau$, mark $3\tau$, space $7\tau$ and mark $5\tau$. Although the reference signal E has a pulse width of $7\tau$, it becomes "L" if the reset signal (in FIG. 7, $5\tau$) appears before the pulse width of $7\tau$, and is again set to "H" by the set signal after $\tau$. The reference signal E becomes "L" after $7\tau$. Since the timing at which the reference signal E is set is consistent with the fall of the first delay signal $D_1$ it can be judged that if the reference signal E is "H" at the rise of mark $3\tau$ of the signal $D_1$, the space length of the signal $D_1$ immediately before the mark is below $7\tau$, and that if the reference signal E is "L" at the rise of mark $3\tau$ of the signal $D_1$, the space length is above $7\tau$. If the space length is below $7\tau$, then the mark length is made shorter, and a start part auxiliary signal D is used in order to control the pulse train. The signal D is produced by an operation of $D = \overline{D_1} \cdot (D_1 \cdot D_3)$, using a third delay signal $D_3$ which delays the first delay signal $D_1$ by a length (in FIG. 7, $\tau$) which the mark length of the first delay signal $D_1$ is shortened. Next, a mark length control signal $D \cdot E = F$ is produced from the reference signal E, and then a start part control signal $A \cdot \overline{F} = A'$ is produced. As shown in FIG. 7, when the space length is shorter than the reference signal E, the rise position of the control signal A' is delayed from that of the control signal A by $\tau$. When, on the other hand, the space length is longer than the reference signal E, the rise position of the control signal A' is the same as that of the control signal A. Since the fall position of the control signal A' is the same as that of the control signal A, the write mark length can be controlled according to the length of the space. Instead of the control signals A, B and C described in the basic operation of the control-signal generating circuit 3, by inputting the control signals A', B and C to the pulse forming circuit 4, a pulse forming output (shown in the lowest end of FIG. 7) is obtained which has a pulse train having a length corresponding to the space length immediately before the mark length.

From the foregoing description, in this embodiment, the write signal for writing the pit is divided into three parts, which are then converted to pulses. Since the widths of the pulses can set independently, the laser beam can be irradiated on the medium at conditions optimum for the three parts described above. In addition, since the space length immediately before the write signal can be detected and since the length of the output pulse train can be controlled according to the detected space length, the influence of the remaining heat from the previous written pit can be effectively corrected. Therefore, even in the case of high density writing, the pit is accurately written, and consequently a regenerative signal of better CNR can be obtained.

Although in the above description the counter of the pulse forming circuit 12 is binary number and four positions, the present invention is not limited to this. Of course, the number of positions can be increased, and a large number of pulse-width set circuits can be provided. In addition, instead of the monostable multivibrators for generating first to nth pulses, the pulse width may also be determined by digital means such as a counter.

Moreover, although analog means such as a monostable multivibrator has been used in the generation of the reference signal of the pulse-train control signal, digital means such as a counter may also be employed. In addition, although in the above description only one reference signal has been used, a plurality of reference signals may also be used. In that case a finer control can be achieved by combination with a plurality of start part auxiliary signals D. For example, a mark length is $-\tau$ for space lengths 3τ to 4τ, mark length is −0.5τ for space lengths 5τ to 7τ, and mark length is unchanged for space lengths 8τ to 11τ.

Second Embodiment

Figure 8:
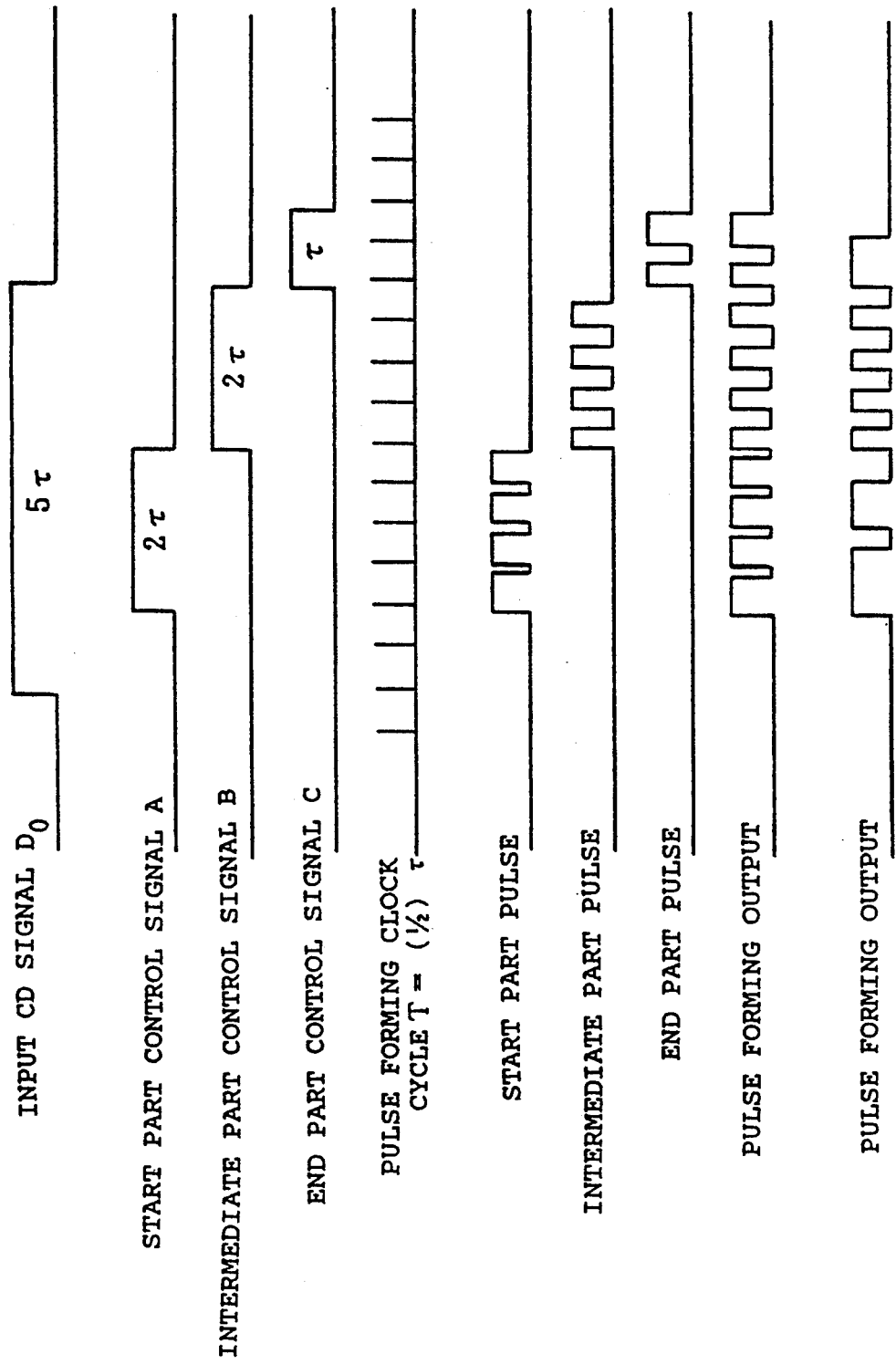
FIG. 8 is a timing diagram of a second embodiment of the present invention.

FIG. 8 is used to explain a second embodiment of the present invention. This embodiment is characterized in that the cycle of the pulse forming clock is $(\frac{1}{4})\cdot\tau$. That is to say, since, as shown in FIG. 8, in this embodiment the resolution of the pulse formation is double the first embodiment, a finer pulse-width setting can be performed. Note that a pulse width condition of the pulses of the start part can be set as in the first embodiment, by setting the pulse widths of monostable multivibrators 21a and 21c to those of the monostable multivibrators 21a and 21c of the first embodiment and by setting the pulse trailing ends of monostable multivibrators 21b and 21d so that they will not exceed the pulse trailing end which was set in the monostable multivibrator 21a or 21c of the first embodiment.

Since in the pulse forming circuit 4 shown in FIG. 3 the outputs of the monostable multivibrators 21a to 21n are logically synthesized by the OR gate 16 which is an aggregate circuit, no failure occurs even if two pulses are generated at the same time. It is also possible that the monostable multivibrators 21a and 21c are set to $(\frac{1}{4})\cdot\tau$ and the remaining pulse widths are set by the monostable multivibrators 21b and 21d. This can be applied to the end part in the same way. In addition, the cycle of the pulse forming clock can be set to $(\frac{1}{8})\cdot\tau$ or $(\frac{1}{4})\cdot\tau$ in order to increase the resolution.

Third Embodiment

Figure 9:
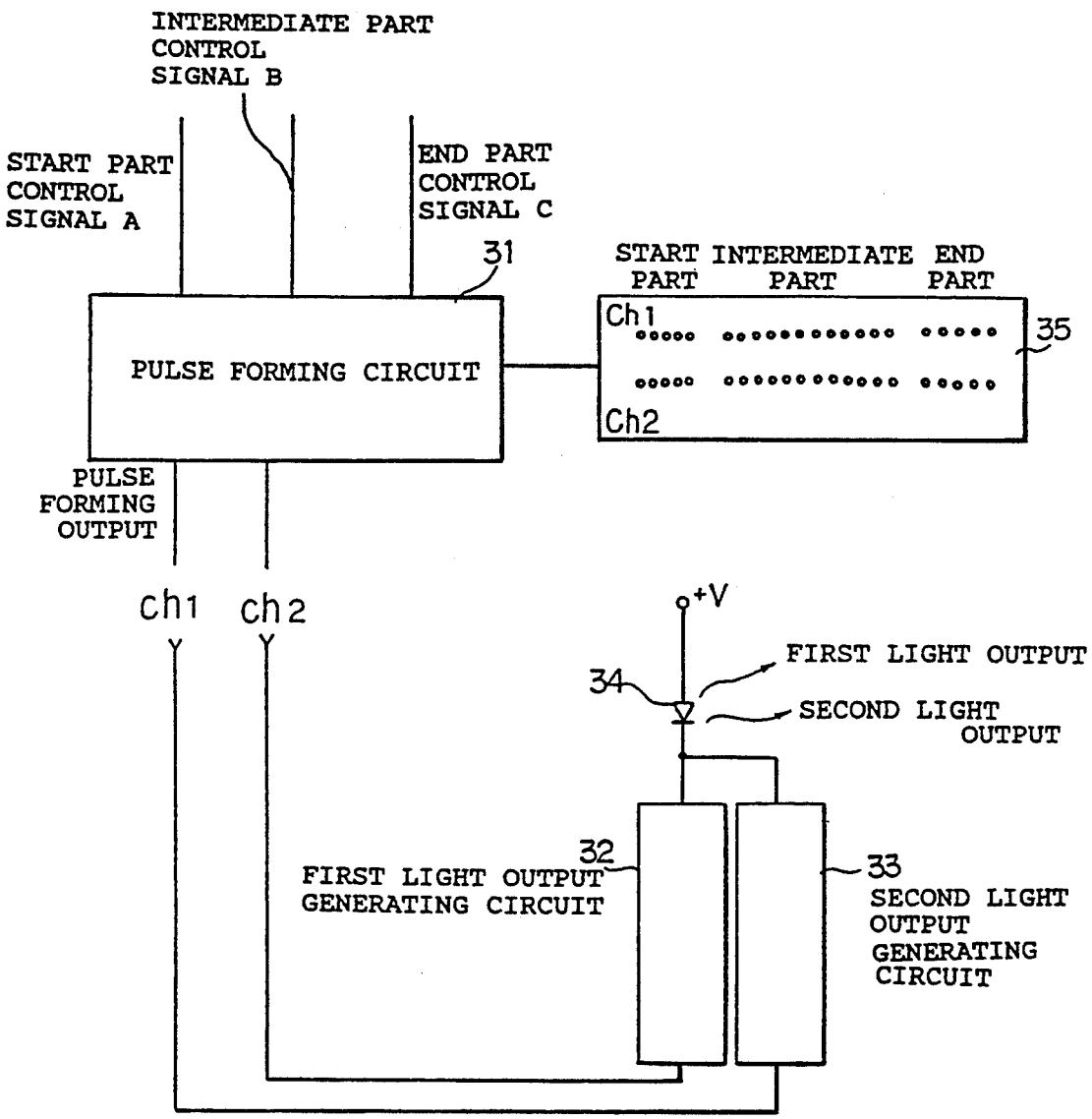
FIG. 9 shows the output system of a pulse forming circuit of a third embodiment of the present invention.
Figure 10:
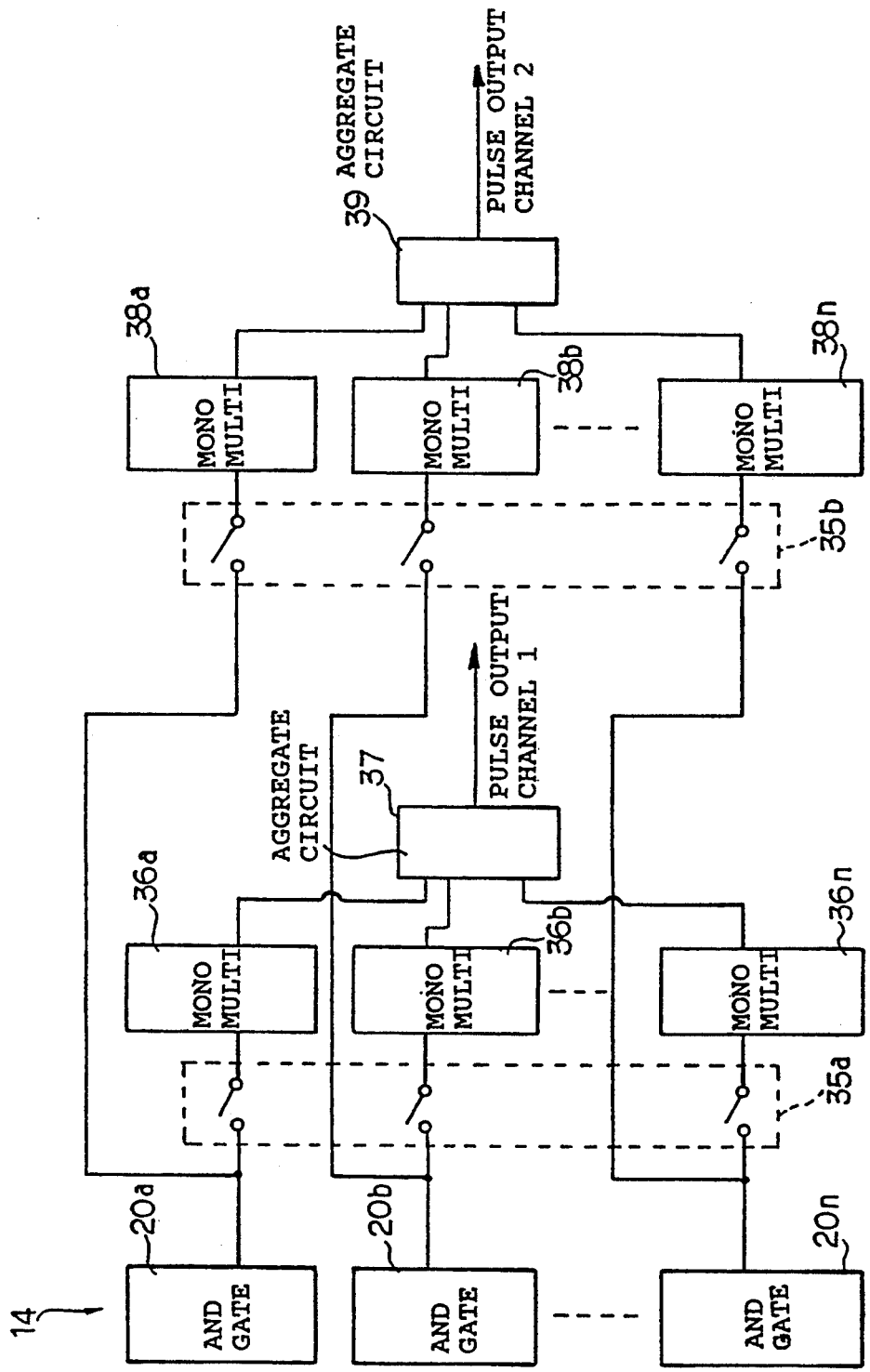
FIG. 10 shows the structure of pulse prohibition means of the third embodiment.

FIGS. 9-11 illustrate a third embodiment of the present invention. As shown in FIG. 9, this embodiment is characterized in that a pulse forming circuit 31 outputs a plurality of pulse forming outputs (two channels of channel 1 and channel 2) to first and second light output generating circuits 32 and 33, respectively. The circuits 32 and 33 are connected to a laser diode 34. In addition, there is provided pulse prohibition means 35 for prohibiting individually the generations of a first pulse, second pulse, . . . , and nth pulse of each of the start part, intermediate part and end part of each channel.

The pulse prohibition means 35 is constituted by a great number of switches such as snap switches. As shown in FIG. 10, pulse prohibition means 35a is provided between AND gates 20a to 20n and monostable multivibrators 36a to 36n. The monostable multivibrators 36a to 36n are connected to an aggregate circuit 37, from which the channel 1 of the pulse forming output is outputted. Likewise, pulse prohibition means 35b is provided between the AND gates 20a to 20n and monostable multivibrators 38a to 38n. The monostable multivibrators 38a to 38n are connected to an aggregate circuit 39, from which the channel 2 of the pulse forming output is outputted.

FIG. 11 shows the timing and the light output of the laser diode 34 of the third embodiment. In this example, the mark length is 5τ, the width of the start part control signal A is 2τ, and the cycle of the pulse forming clock is $T = (\frac{1}{2})\cdot\tau$.

Since in the third embodiment the cycle of the pulse forming clock is $T=(\frac{1}{2})\cdot\tau$, four pulse prohibition means 35 are for the start part, two for the end part and 16 for the intermediate part, as shown in FIG. 11(b). If the pulse prohibition means 35a and 35b of the channels 1 and 2 in FIG. 10 are set as shown by OX in FIG. 11(b), the pulse forming outputs of the channels 1 and 2 then become as shown in FIG. 11(c). Since the outputs of the channels 1 and are connected respectively to the first and second light output generating circuits 32 and 33, the light output of the laser diode 34 comprises two leading pulses having second light outputs larger than normal and the remaining pulses having first light outputs of normal size, as shown in FIG. 11(d).

Thus, in this embodiment, by outputting a plurality of pulse forming outputs (a plurality of channels) from the pulse forming circuit 31 and by providing the pulse prohibition means 35 for prohibiting the generation of each pulse individually, not only the pulse width but also the light output can be varied, and consequently optimum writing conditions can be set more finely.

Although this embodiment has been described with respect to 2 channels, channels of 3 and above may also be provided in order to vary the light output more finely. In addition, the pulse prohibition means is not necessarily needed to be constituted by switches. For example, means for removing pulse generation means, or means for removing a connection can be used.

Fourth Embodiment

Figure 12:
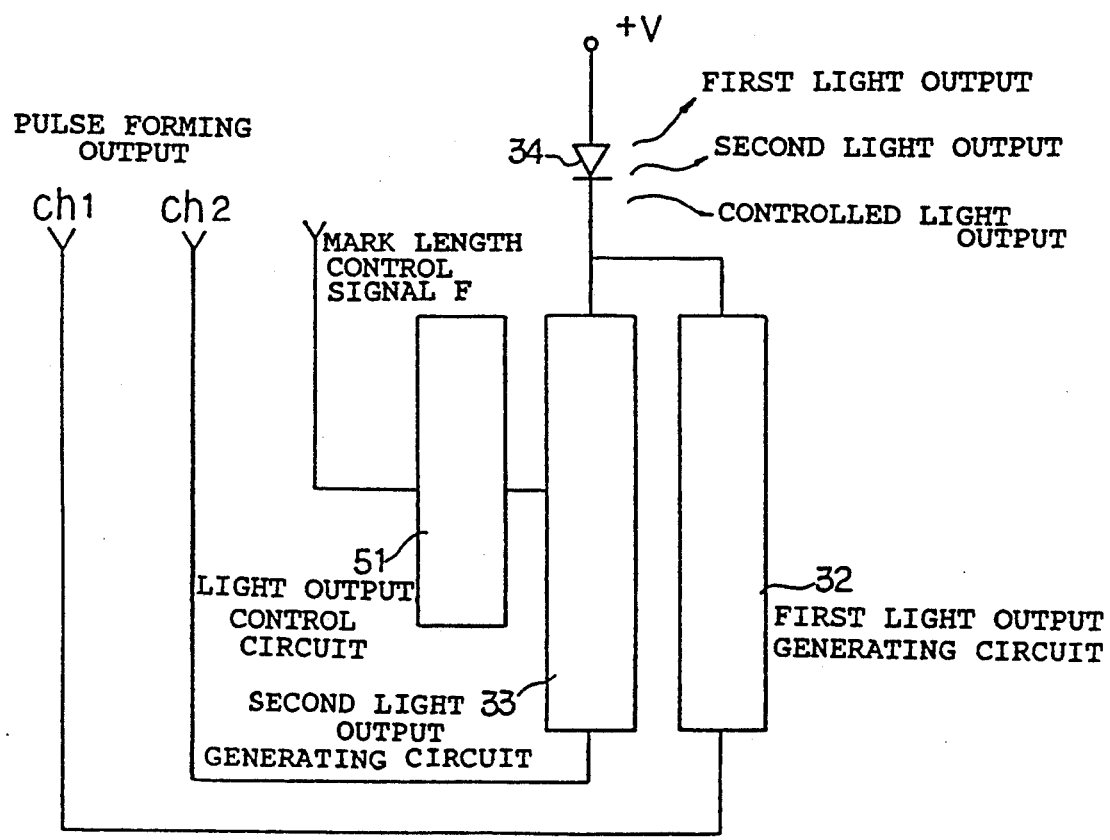
FIG. 12 shows the output system of a pulse-forming output signal of a fourth embodiment of the present invention.

FIGS. 12 and 13 illustrate a fourth embodiment of the present invention. In this embodiment, in order to correct the influence of the remaining heat from the previously written pit, the light output of the write start part pulse is controlled according to the space length immediately after the previously written pit. As the control signal, the mark length control signal F shown in the first embodiment is used. That is to say, this embodiment is substantially identical to the structure of the third embodiment of FIG. 9, except there is provided a light output control circuit 51 to which the mark length control signal F is inputted. The light output control circuit 51 is connected to the second light output generating circuit 33. On the basis of the mark length control signal F, the amplitude of the write start part pulse is varied by the light output control circuit 51 in accordance with the space length immediately after the previously written pit, as shown in FIG. 13, and consequently the light output is controlled finely. Therefore, this embodiment also can effectively correct the influence of the remaining heat.

Although only one reference signal E and one mark length control signal F have been described for convenience, a plurality of mark length control signals $F_1$ to $F_n$ can be produced from a plurality of reference signals $E_1$ to $E_n$. In that case, the light output corresponding in size to each mark length control signal can be outputted at the light output control circuit 51, and consequently the light output can be controlled more finely.

Fifth Embodiment

Figure 14:
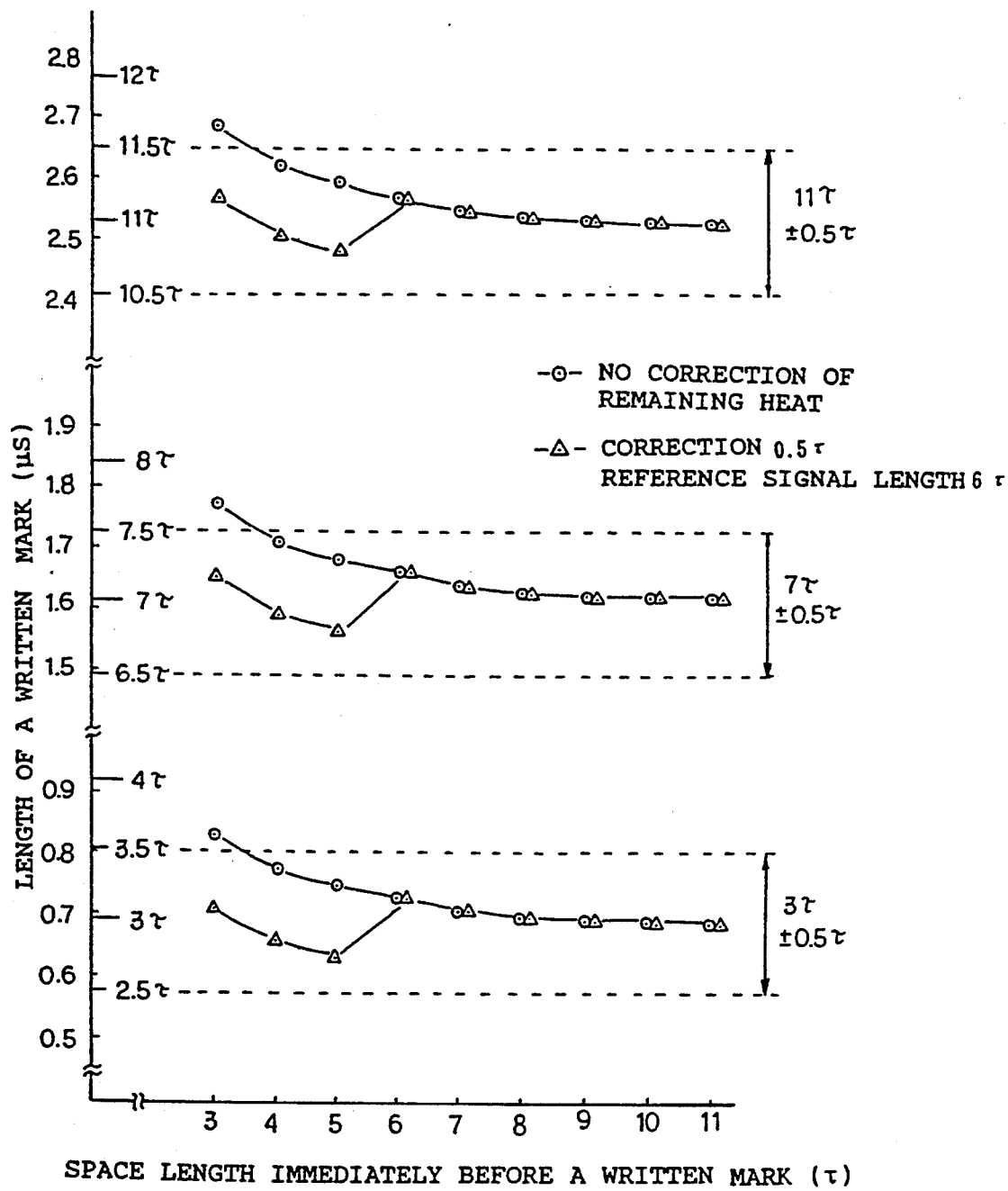
FIG. 14 is a diagram showing the result obtained by correcting the influence of remaining heat by the first and second embodiments.
Figure 15:
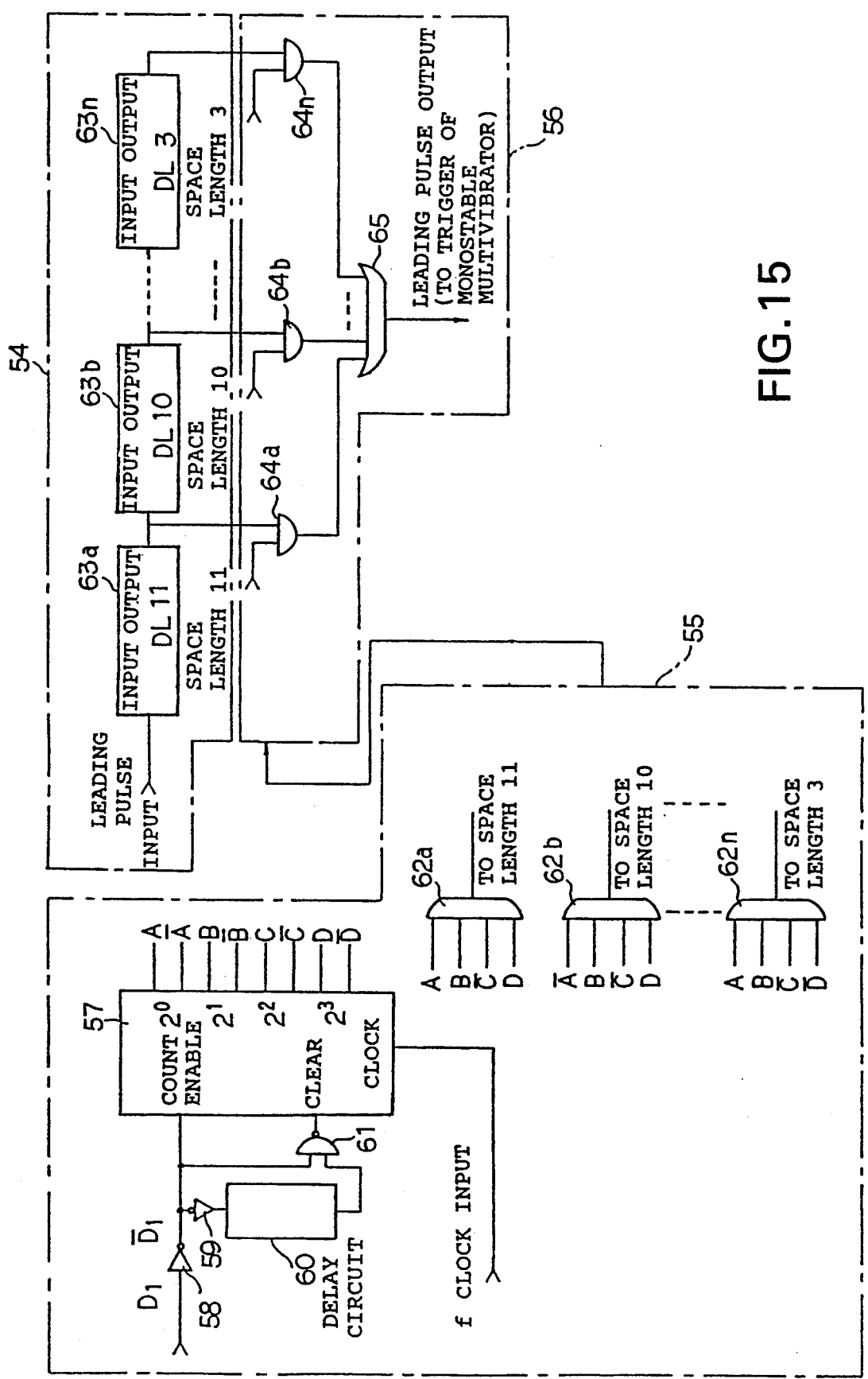
FIG. 15 is a block diagram showing the structure of a pulse train control circuit of a fifth embodiment of the present invention.
Figure 16:
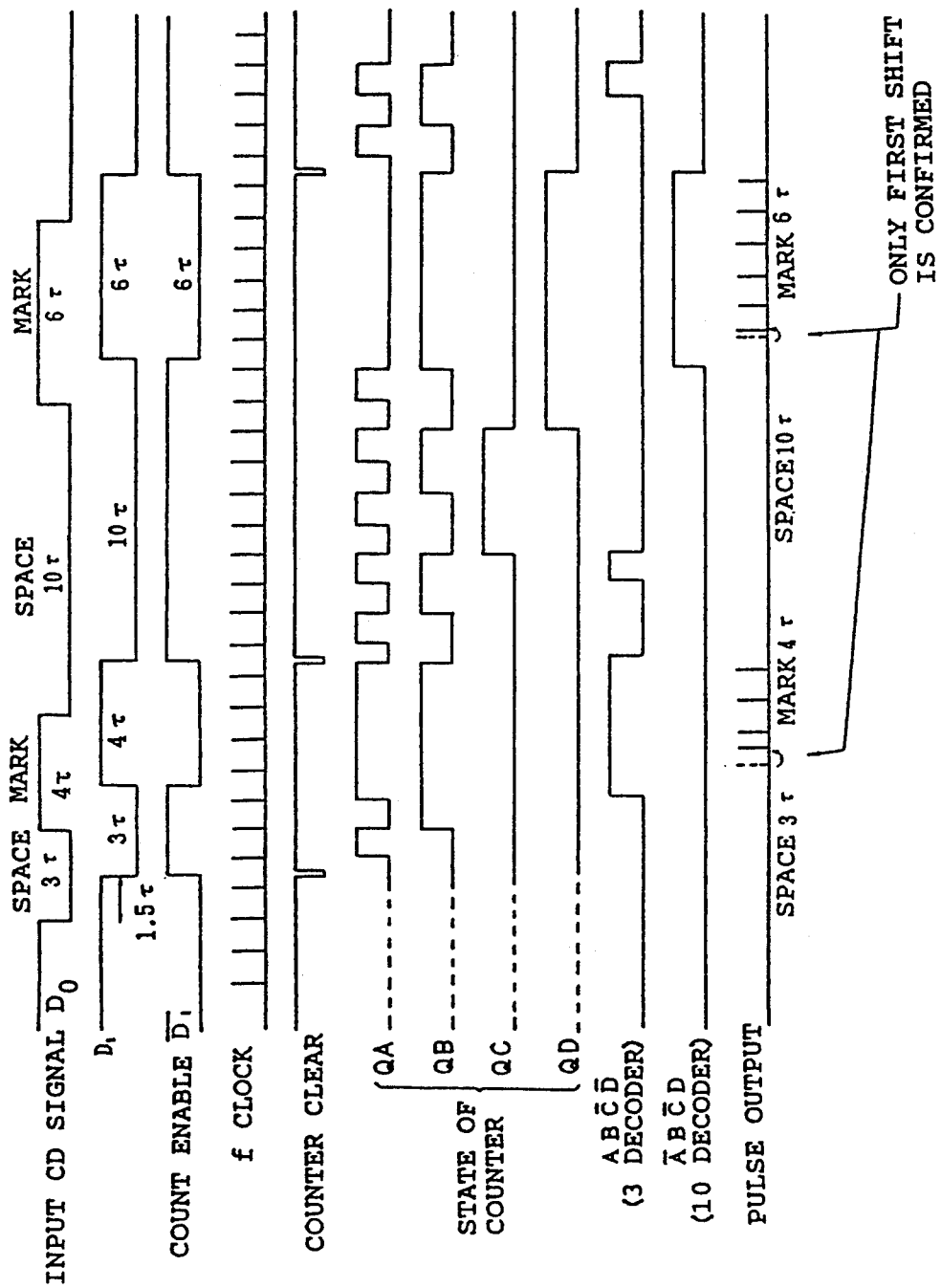
FIG. 16 is a timing diagram of the fifth embodiment.
Figure 17:
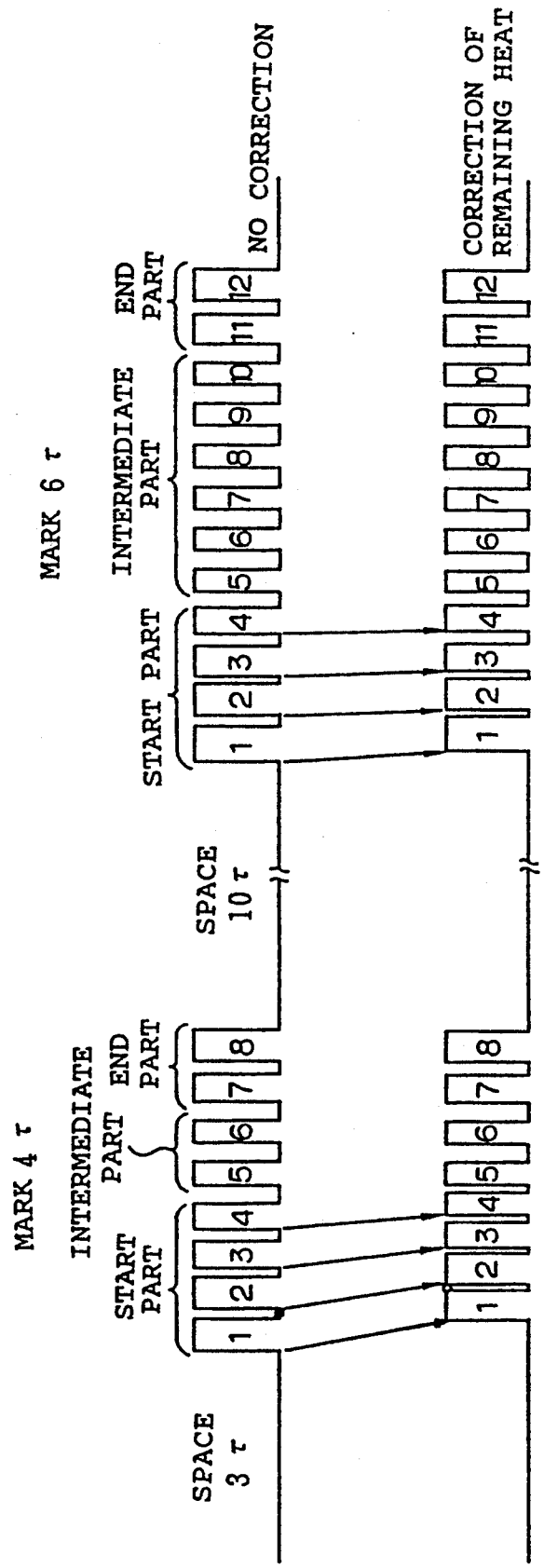
FIG. 17 shows a pulse output that has been formed by a plurality of passing-path selection means of the fifth embodiment.

FIG. 14 shows the result obtained by correcting the influence of the remaining heat by the first and second embodiments of the present invention. FIGS. 15-17 show a fifth embodiment of the present invention.

In the first embodiment, in order to correct the influence of the remaining heat from the previously written mark, the mark write start position is controlled by increasing or decreasing the number of generated pulses in accordance with the space length immediately after the previous mark. FIG. 14 is used to explain the correction of the remaining heat as the second embodiment was applied to the first embodiment. That is to say, under the write pulse condition in which each pulse width of the above described favorable write pulse condition (pulse forming clock $\tau$) is reduced to half, the correction of the remaining heat was made with the delay time of the third delay signal $D_3$ of $0.5\tau$ and with the reference signal length of $6\tau$ (the correction of the remaining heat is made only when the space length immediately before the mark length is between $3\tau$ and $5\tau$). The "o" shown in FIG. 14 is a case where the correction of the remaining heat was not made, while the "$\Delta$" is a case where the correction of the remaining heat was made at the above described condition. When the space length is between $3\tau$ and $5\tau$, the written mark length is shortened by about $0.5\tau$ by the correction. Since errors in the written mark lengths are within $\pm 0.5\tau$ which is a discriminative reference of a read signal, the correction of the remaining heat has been made effectively.

However, in this method, the resolution of the write start position is limited by the cycle of the pulse forming clock. Where a finer correction is required, for example, where the write start position is required to vary 10 ns by 10 ns each time the space length varies $1\tau$, the pulse forming clock of 10 ns cycle (100 MHz frequency) is needed, and cannot be obtained with TTL presently in use. In addition, where the write start position is controlled each time the space length varies $1\tau$ between $3\tau$ and $11\tau$, nine reference pulses are needed and consequently the number of the hardwares is increased.

Such a fine control of the write start position can be achieved by the fifth embodiment shown in FIG. 15. In FIG. 15, the pulse train control circuit in this embodiment is constituted by a passing path group 54 for a leading pulse (the first pulse of the start part shown in FIG. 3), space recognition means 55 for recognizing a space length, and passing-path selection means 56 for selecting a passing path of the leading pulse from the recognition result of the recognition means 55. The space recognition means 55 is constituted by a counter 57 for counting the space length at the rate of $1\tau$, inverters 58, 59, a delay circuit 60, a NAND gate 61, and AND gates 62a to 62n (decode circuits) to which the outputs of the counter 57 are inputted. In addition, the passing path group 54 is constituted by delay lines (DL) 63a to 63n connected in series which serve as the passing path of the leading pulse. The passing-path selection means 56 is constituted by AND gates 64a to 64n to which each space length and the outputs of the delay lines 63a to 63n are inputted, and a OR gate 65 as an aggregate circuit. From the OR gate 65 is outputted a trigger signal of the monostable multivibrator 21a of FIG. 3, as a leading pulse output.

In the structure as described above, assume that the inverted signal $\overline{D_1}$ of the first delay signal $D_1$ has been inputted to the enable terminal of the counter 57. If the signal $\overline{D_1}$ becomes "H" after the space part is inputted, then the counter 57 starts counting clocks. If the mark part is inputted after the space part, then the signal $\overline{D_1}$ becomes "L", and the content of the counter 57 immediately before the mark part is maintained. That is to say, the counter 57 functions as a memory which accumulates the data of the space length at the time the mark part is inputted. Therefore, by decoding the content of the counter 57, only one decoder output corresponding to the space length becomes "H" at the time the mark part has appeared. A 3 decoder output (corresponding to the space length $3\tau$) and 10 decoder output (corresponding to the space length $10\tau$) are shown in FIG. 16. These outputs are used to select the passing path of the leading pulse. The counter 57 is reset at the rise of the signal $D_1$ and starts counting the next space length.

On the other hand, the leading pulse (first pulse of the start part) that is used to trigger the monostable multivibrator 21a shown in FIG. 3 is inputted to the delay lines 63a to 63n of the passing path group 54, before the leading pulse is inputted to the monostable multivibrator 21a. The passing path group 54 is constituted by the delay lines 63a to 63n ($DL_{11}$, $DL_{10}$, ... $DL_3$), and the $DL_{11}$, $DL_{10}$, ... $DL_3$ correspond to the space lengths immediately before the mark lengths $11\tau$, $10\tau$, ..., and $3\tau$, respectively. Since the outputs of the delay lines 63a to 63n are connected to the AND gates 64a to 64n which are controlled by the outputs of the AND gates 62a to 62n, only a pulse which has passed the path of the delay time corresponding to the space length is taken out and triggers the monostable multivibrator 21a (FIG. 3). In this way, the space length immediately before the mark part is recognized, and the position of generation of the leading pulse is controlled according to the recognition.

By providing taps of 5 ns with the delay lines 63a to 63n, the position of generation of the leading pulse can be controlled with this time resolution. As a result, a time resolution of 10 ns and below can be achieved with a TTL presently in use.

Although in the above description only one passing-path selection means 56 is provided and the correction of the remaining heat has been made by delaying only the first pulse of the start part, the correction of the remaining heat can also be made by providing a plurality of passing-path selection means and delaying first to nth pulses of the start part. In that case only one space recognition means 55 is required. Moreover, the delay times of a plurality of passing path selection means corresponding to the first to nth pulses of the start part can be gradually varied such that when the space length is $3\tau$, the delay time of the first pulse is 150 ns, the delay time of the second pulse is 140 ns, ..., and the delay time of the nth pulse is $(160-10\,n)$ns. In addition, the delay times can be gradually varied such that when the space length is $10\tau$, the delay time of the first pulse is 20 ns, the delay time of the second pulse is 15 ns, ..., and the delay time of the nth pulse is $(25-5\,n)$ns. In that case an output pulse train as shown in FIG. 17 can be obtained, and consequently a finer correction of the remaining heat can be made.

Sixth Embodiment

Figure 18:
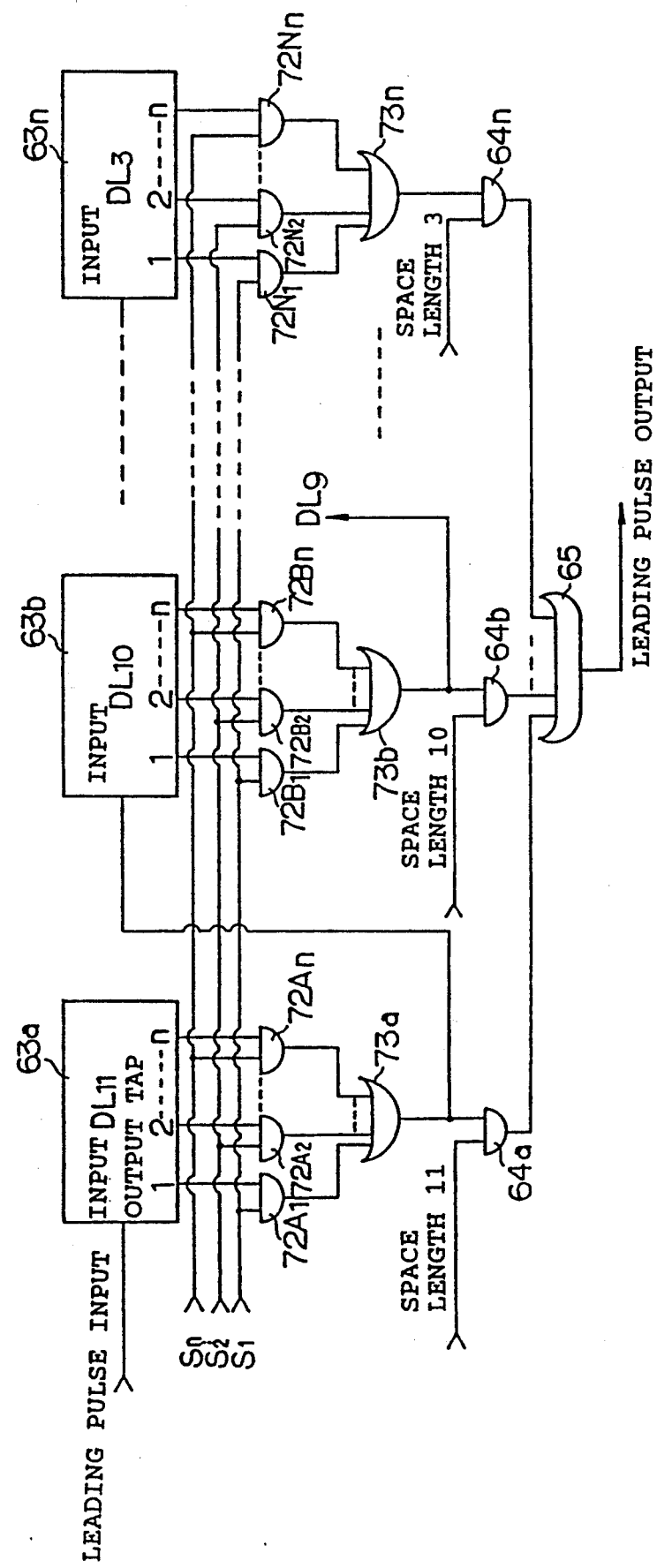
FIG. 18 shows the structure of a circuit for generating a leading pulse in accordance with a sixth embodiment of the present invention.
Figure 19:
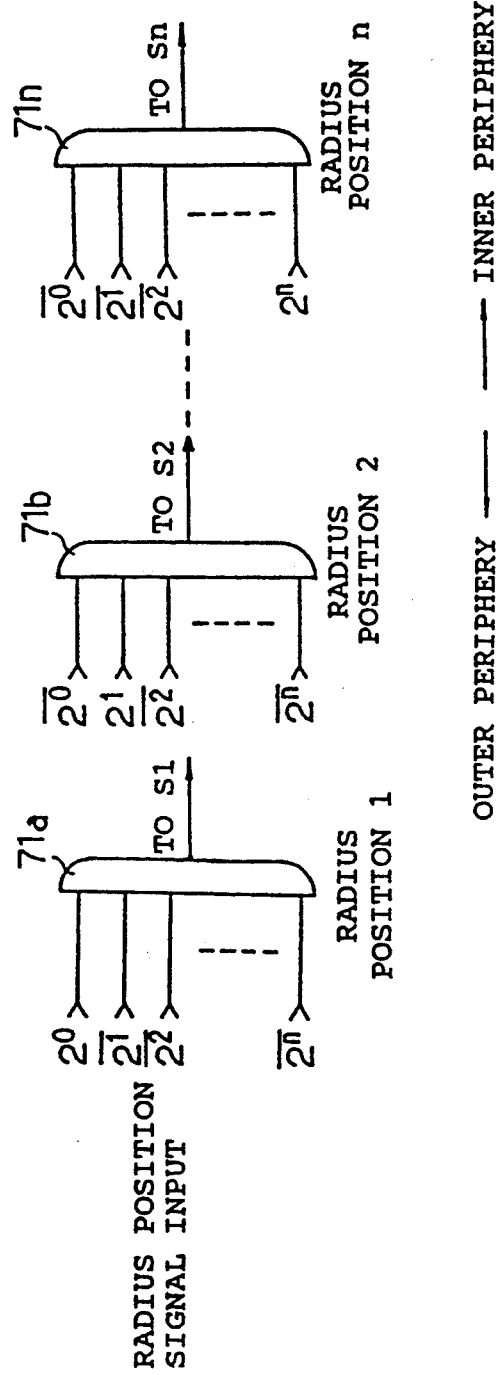
FIG. 19 shows the structure of a circuit for selecting a radius position in accordance with the sixth embodiment.

FIGS. 18 and 19 shown a sixth embodiment of the present invention. Although the control of the leading pulse position based on the space length that has been described in the fifth embodiment is suited to a CD (compact disk) recording which is representative of a recording in a constant rotational line speed (i.e., Constant Linear Velocity), the control cannot be applied to a recoding in a constant rotational angular speed (i.e., Constant Angular Velocity) such as a magneto-optical disk recording. Namely, in the recording in a constant rotational angular speed, the line speed becomes faster in the outer peripheral portion of the disk than in the central or inner portion, and therefore even if signals having the same length sin time are recorded, the recorded length on the outer peripheral portion becomes longer. Therefore, the influence of the remaining heat becomes smaller in the outer peripheral portion than in the inner peripheral portion.

Hence, in the sixth embodiment, the delay times of the delay lines 63a to 63n are varied in accordance with the radius of gyration of the disk.

In the recording in a constant rotational angular speed, there is provided means for detecting the present position of the radius of gyration from a position of an optical head or an address recorded in a medium. This signal means is normally represented by binary notation. For this reason, in this embodiment radius position signals represented by binary signals are inputted to AND gates 71a to 71n that are used as decode circuits, as shown in FIG. 19. One of the outputs of the AND gates 71a to 71n that are used as the decoders for detecting the radius position, becomes "H". As shown in FIG. 18, the outputs $S_1$ to $S_n$ of the AND gates 71a to 71n are inputted to AND gates $72A_1$ to $72A_n$, $72B_1$ to $72B_n$, ..., and $72N_1$ to $72N_n$ which are used as radius position selection gates. The other input terminals of the AND gates $72A_1$ to $72A_n$, $72B_1$ to $72B_n$, ..., and $72N_1$ to $72N_n$ are connected to the output taps 1, 2, ... n of the delay lines 63a to 63n. In addition, the outputs of the AND gates $72A_1$ to $72A_n$, $72B_1$ to $72B_n$, ..., and $72N_1$ to $72N_n$ are inputted to AND gates 73a to 73n, respectively, as shown in FIG. 18. In the next step there is provided space recognition means 55 which is identical in part with the fifth embodiment. Therefore, by making "H" one of the outputs $S_1$ to $S_n$ of the radius position selection gates, one of the output taps 1, 2, ... n of the delay lines 63a to 63n is selected. Only the leading pulse which has passed through the selected output tap is inputted to the delay line of the next step, and becomes a leading pulse output by subsequent processes.

Note that the delay time between the input of and the output tap of each of the delay lines 63a to 63n is not necessarily the same between the delay lines 63a to 63n, and can be set according to the characteristics of disk media. In addition, the selection means for selecting a passing path according to the space length is identical in construction with that of the selection means 56 of the fifth embodiment.

Although in the above description the correction of the remaining heat has been made by the leading pulse (first pulse of the start part), it can also be made by providing a plurality of the circuits shown in FIGS. 18 and 19 and using the first to nth pulses of the start part, as in the case of the fifth embodiment.

Seventh Embodiment

FIGS. 20-27 show a seventh embodiment of the present invention. This embodiment performs the correction of the remaining heat based on the space length more finely than the embodiments described above.

Figure 21:
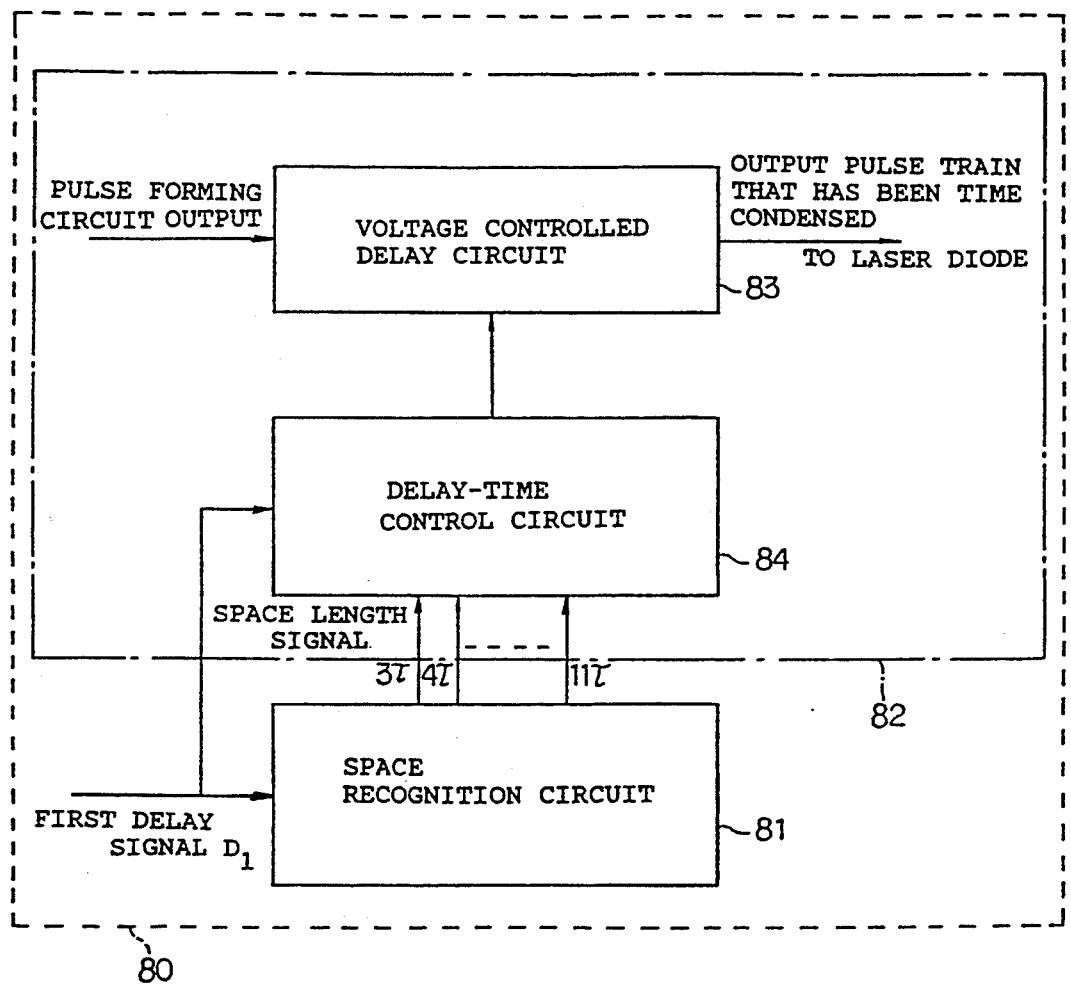
FIG. 21 illustrates the structure of a pulse train control circuit of the seventh embodiment.

A pulse train control circuit 80 of this embodiment shown in FIG. 21 is constituted by a space recognition circuit 81 and a time-condensation control circuit 82.

The space recognition circuit 80 is the same circuit as the space recognition means 55 shown in FIG. 15, and generates space length signals corresponding to the space lengths $3\tau$ to $11\tau$.

Figure 22:
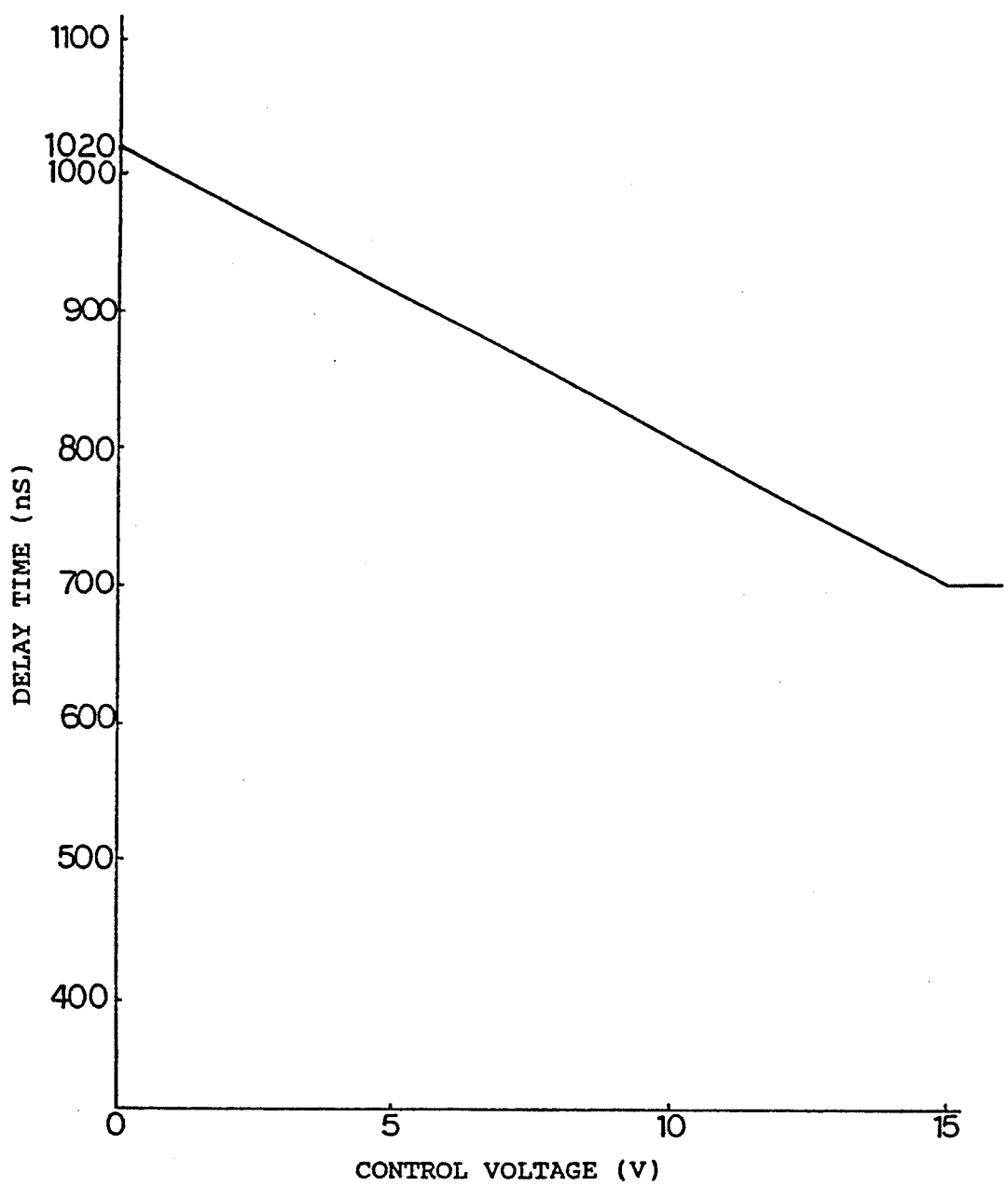
FIG. 22 is a diagram showing the characteristic of a voltage controlled delay circuit of the seventh embodiment.

The time-condensation control circuit 82 is constituted by a voltage controlled delay circuit 83 and a delayed time control circuit 84. The voltage controlled variable delay circuit 83 varies its delay time in response to a control voltage applied thereto, and is constituted by a combined element of a variable capacity diode and an inductance which is called VCVDL (Voltage Controlled Variable Delay Line). In this embodiment two elements produced by JPC Co., Ltd. are used, and as shown in FIG. 22, a variable range of 1020 ns to 700 ns is obtained with respect to a control voltage of 0 to 15 V.

Figure 23:
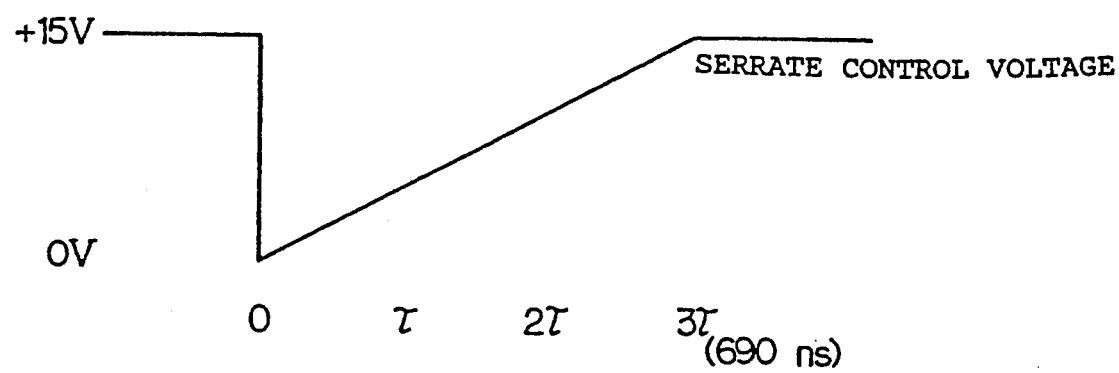
FIG. 23 is a diagram showing a serrate control voltage and delay time of the seventh embodiment.
Figure 24:
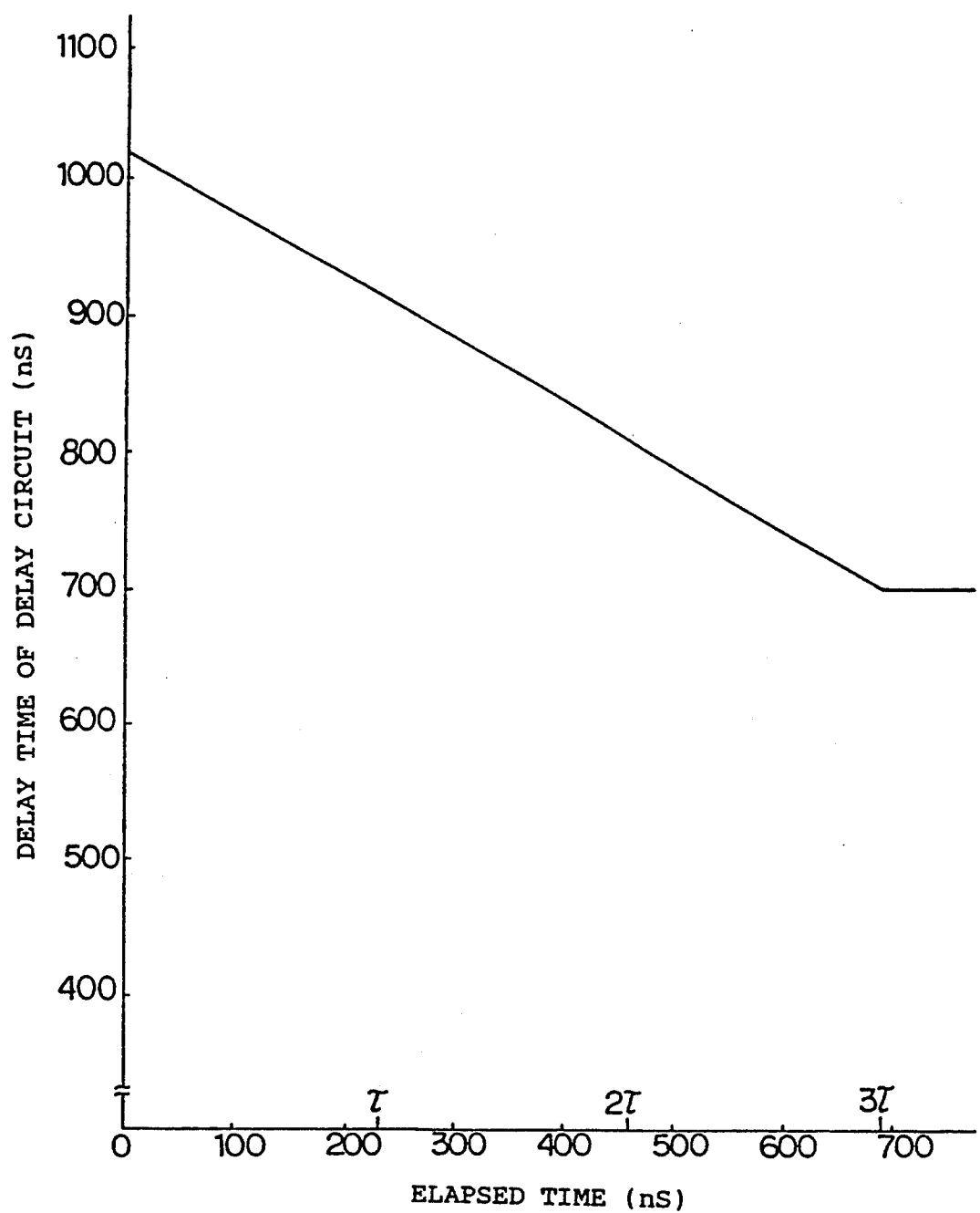
FIG. 24 is a diagram showing the characteristic of the voltage controlled delay circuit of the seventh embodiment.

Consider now a case where a serrate control voltage of $3\tau$ length (690 ns) shown in FIG. 23 was applied to the voltage controlled variable delay circuit 83. The delay time of the voltage controlled variable delay circuit 83 varies as shown in FIG. 24 with respect to the elapsed time of the abscissa. The pulse inputted to the voltage controlled variable delay circuit 83 at the timing of the elapsed time 0 is propagated through the circuit 83, but the delay time of the delay circuit 83 varies moment by moment as shown in FIG. 24 during the propagation. Therefore, the pulse is delayed by a mean value ((1020+700)/2=860 ns), which is obtained by averaging the delay time (1020 ns) of the delay circuit 83 at which the pulse is inputted and the delay time (700 ns) in the stable state, and appears in the output terminal of the delay circuit 83. In addition, a pulse inputted at the elapsed time of 300 ns is delayed by 790 ns(=(880+700)/2), since the delay time of the delay circuit 83 at that time is 880 ns. Thus, if a pulse is inputted more late from the time the serrate control voltage was applied, the delay time becomes shorter. However, for pulses inputted more than 690 ns late, the delay time becomes 700 ns at all times since a control voltage is no longer applied.

FIG. 25 shows an example of a pulse train which was time condensed according to the above described principles. The correction value of remaining heat at a $3\tau$ space is 160 ns, and the serrate control voltage corresponding to this is 15 V and 690 ns, as shown in FIG. 25(b). In addition, as the input pulse train, a pulse train of a mark length $4\tau$ that was formed at favorable conditions ( FIG. 25(a)) was used The leading edge of the first pulse of the input pulse train is delayed, and outputted after 860 ns. Since the trailing edge of the first pulse is inputted after 100 ns, it is delayed by (974+700)/2=837 ns in accordance with the above described principles, and outputted at the time of 837+100=937 ns. Consequently, the first pulse width of the output pulse train becomes 937−860=77ns. Likewise, the leading edge of the second pulse becomes 948 ns, the trailing edge 1025 ns and the pulse width 77 ns. In the same way, the leading edge and width of the third pulse become 1036 ns and 62 ns. The leading edge and width of the fourth pulse become 1125ns and 46 ns. The leading edges of the fifth and sixth pulses become 1213 ns and 1301ns, respectively, and the widths become 46 ns and 39 ns, respectively. At the time the seventh pulse is inputted, the control voltage has become stable. Therefore, the seventh and eighth pulses are delayed by 700 ns and outputted. In this way, the output pulse train shown in FIG. 25(c) is obtained. In fact, a pulse train composed of various mark lengths and space lengths is inputted, but the position of the trailing edge of the last pulse is maintained at a position delayed by 700 ns from the input pulse. That is to say, while the relationship between the mark length and space length of the input signal is being maintained, only pulse train of the part corresponding from the leading edge of each pulse to the width of the serrate control voltage is time condensed for the correction of the remaining heat.

In the method of the fifth embodiment shown in FIG. 17, even if the first, second, third and fourth pulses were respectively delayed 160 ns, 150 ns, 140 ns and 130 ns to perform the correction of the remaining heat, only space part would be condensed and each pulse width would not be varied. On the other hand, the seventh embodiment is characterized in that each pulse width and each space part are both condensed at the same rate.

In the input pulse train shown in FIG. 25(a), the sum of the pulse widths is 590 ns, and the rate of the sum of the pulse widths to the length of the pulse train (pulse formation rate) is about 67%. In the method of the fifth embodiment shown in FIG. 17, the sum of the pulse widths is the same, and the length of the pulse train becomes 885−160 =725 ns. Therefore, the pulse formation rate is 590/725=0.81 (81%) and becomes larger than that (67%) of the input pulse train. On the other hand, since in the seventh embodiment the sum of the pulse widths is 487 ns, the pulse formation rate becomes 487/725=0.67 (67%) and equal to that (67%) of the input pulse train.

It can be considered that the pulse formation rate is the energy density of the write laser beam. Therefore, if the pulse formation rate is maintained to be the same as the input pulse train which is a favorable pulse condition, the pit can be written more accurately even when the correction of the remaining heat has been made.

Although the correction of the remaining heat has been made to the start part pulse, it can also be made to the intermediate part. That is to say, in the correction of the remaining heat by the time condensation of the seventh embodiment, even if a pulse train of any shape and combination were inputted, the input pulse train could be condensed similarly over the entire region of the correction range. Therefore, as in the embodiments described above, the pulse train is not always needed to be divided into three parts of the start part, intermediate part and end part. For example, even when each of the mark lengths $3\tau$ to $11\tau$ is constituted by a pulse train of an entirely different combination, the correction of the remaining heat can be made effectively.

Figure 26:
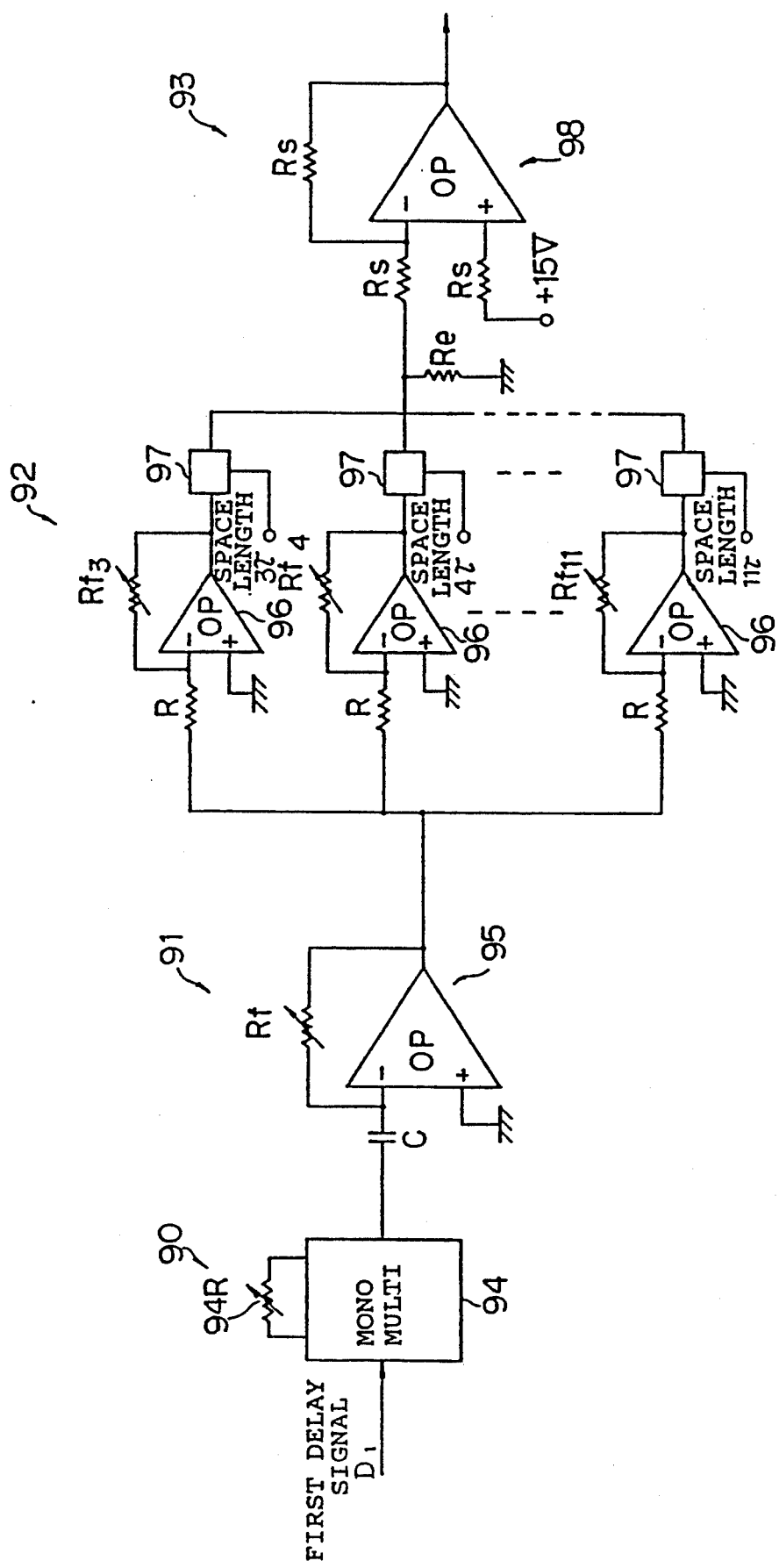
FIG. 26 illustrates the structure of a delay-time control circuit of the seventh embodiment.

FIG. 26 shows an example of the delay-time control circuit 84. The delay-time control circuit 84 comprises a correction-range set circuit 90 for producing from the above described first delay signal $D_1$ a pulse having a width equal to the width of the control voltage, a serrate wave generating circuit 91 for converting the pulse to a serrate wave, a delay-time set circuit 92 for setting a delay time for a favorable correction of the remaining heat in accordance with the results of the space recognition means 55 and 81, and a subtraction circuit 93.

Figure 27A:
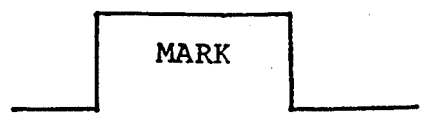
FIGS. 27(a)-27(e) are diagrams illustrating the operational waveform of each part of the delay-time control circuit of the seventh embodiment.
Figure 27B:
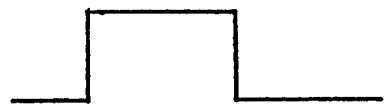

The correction-range set circuit 90 comprises a monostable multivibrator 94 and generates a pulse (FIG. 27(b)) having a pulse width which synchronizes with the rise of each mark part of the input signal $D_1$ as shown in FIG. 27(a). The pulse width can be set by a variable resistor 94R, and is $3\tau$ (690 ns) in this embodiment.

Figure 27C:

The pulse is converted as shown in FIG. 27(c) by the serrate-wave generating circuit 91 which comprises a differentiation circuit 95, and inputted to the delay-time set circuit 92. The linearity of the serrate wave can be varied by adjusting a feedback resistance Rf of an operational amplifier.

Figure 27D:
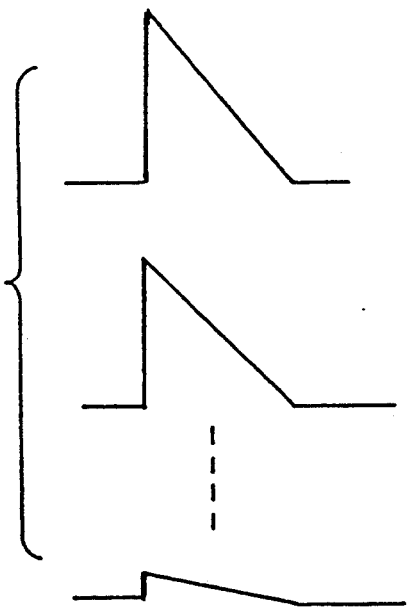

The delay-time set circuit 92 is constituted by nine sets of an amplifier 96 and switch means 97 corresponding to each space length. Since the amplification factor of each amplifier 96 is determined by Rf/R, the peak value of an output serrate wave can be varied by varying the feedback resistances Rf3 to Rf11 of the amplifiers 96. The output of each amplifier 96 can be set as shown in FIG. 27(d). The output of each amplifier 96 is connected to the switch means 97 such as an analog switch, which is controlled by a space length signal outputted from the above described space recognition means 55 or 81. Therefore, in the output side of the switch means 97 appears only one serrate wave having a peak voltage corresponding to the space length (correction value of remaining heat).

Figure 27E:
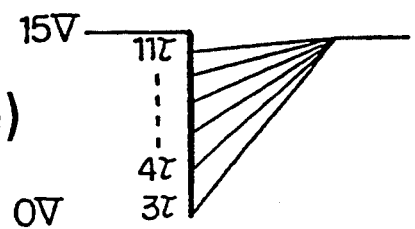

The subtraction circuit 93 is an inversion amplifier 93 having a gain of one time, and constituted by an operational amplifier 98 and resistances Re and Rs. This subtraction circuit 93 outputs a difference between the input terminals. Since the plus input terminal is connected to 15 V, a waveform obtained by subtracting the serrate wave inputted to the minus input terminal from 15 V is outputted as shown in FIG. 27(e). The resistance Re serves to maintain the minus input terminal to be 0 V, when all the switch means 97 are in the off positions. The output of the subtraction circuit 93 is applied as a serrate control voltage to the voltage controlled delay circuit 83 to perform the time condensation described above.

The operational amplifier used in each circuit described above is one which generates an output voltage of 15 V and above, and it is preferable that the amplifier is of the high speed and high slew rate type. For example, it is preferable that LH0032CG and the like be used.

Although in the above example the correction-range set circuit 90 comprises the monostable multivibrator 94 and the serrate-wave generating circuit 91 comprises the differentiation circuit 95, the present invention is not limited to this. For example, by using a serrate wave which generates in the base side of a monostable multivibrator having an asymmetrical time constant, it is possible to incorporate the two circuits in one.

Figure 20:
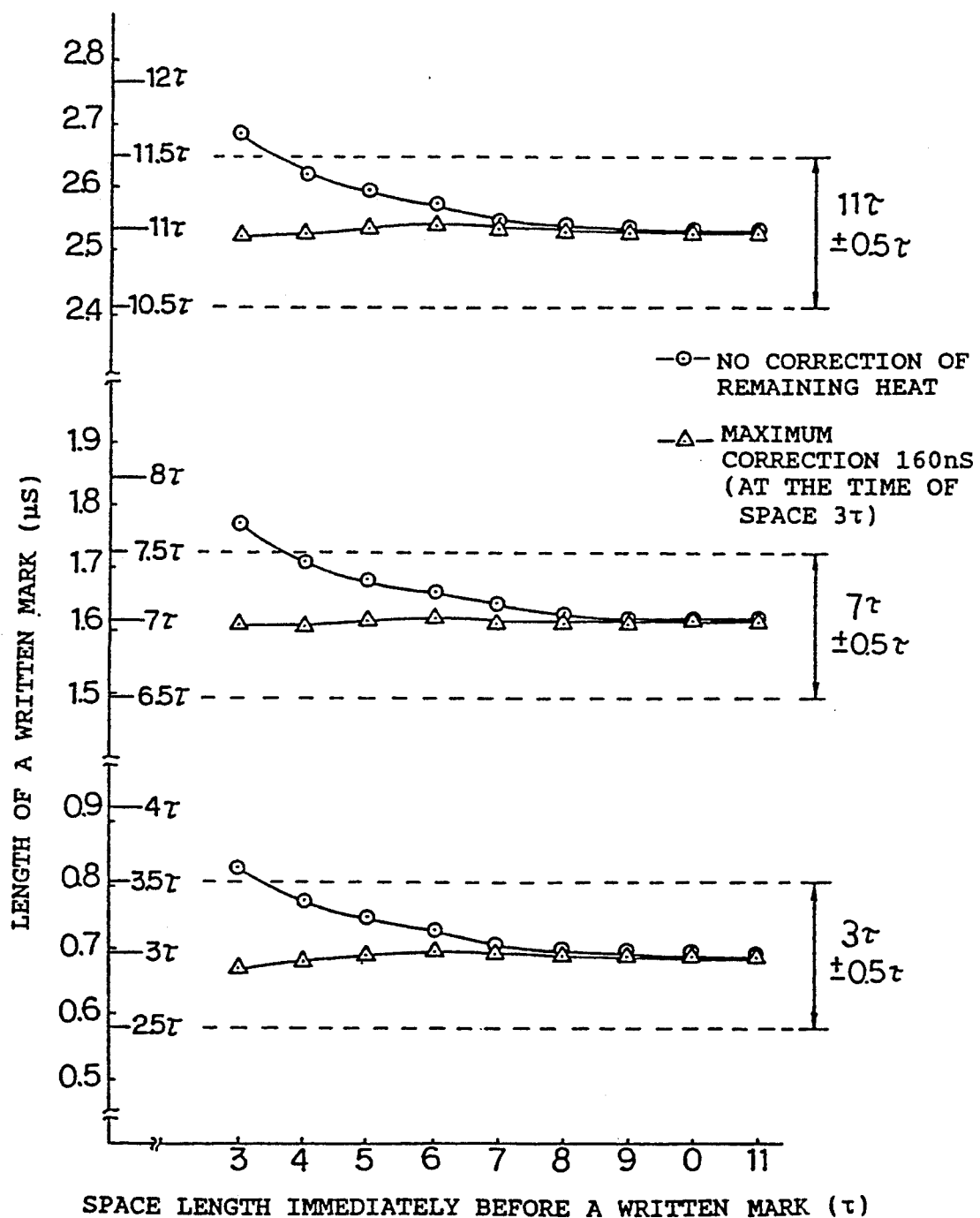
FIG. 20 is a diagram showing an example of the correction of remaining heat of a seventh embodiment of the present invention.

The favorable result of the correction of the remaining heat in accordance with this embodiment is shown in FIG. 20. In FIG. 20, "o" is data obtained when the correction is not made, and "Δ" is data obtained when the correction was made. The input or write pulse train used is the favorable pulse train shown in FIG. 25(a). The correction value (maximum correction) is 160 ns for a space length $3\tau$, 100 ns for a space length $4\tau$, 60 ns for a space length $5\tau$, 30 ns for a space length $6\tau$, 20 ns for a space length $7\tau$, and 10 ns for space lengths of $8\tau$ and above. The result is slightly nonlinear, as shown in FIG. 20, but the correction of the remaining heat has been performed almost perfectly.

Eighth Embodiment

Figure 28:
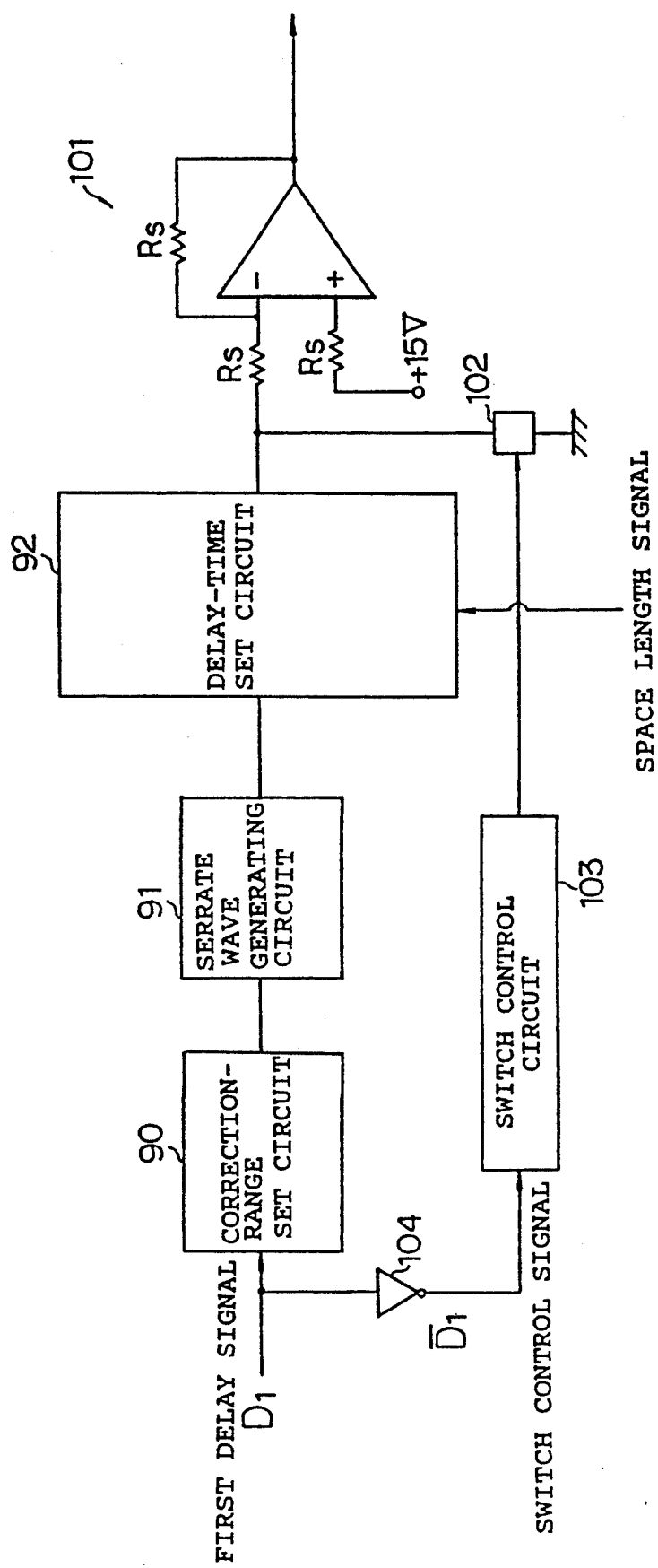
FIG. 28 illustrates the structure of a delay-time control circuit of an eighth embodiment of the present invention.
Figure 29:
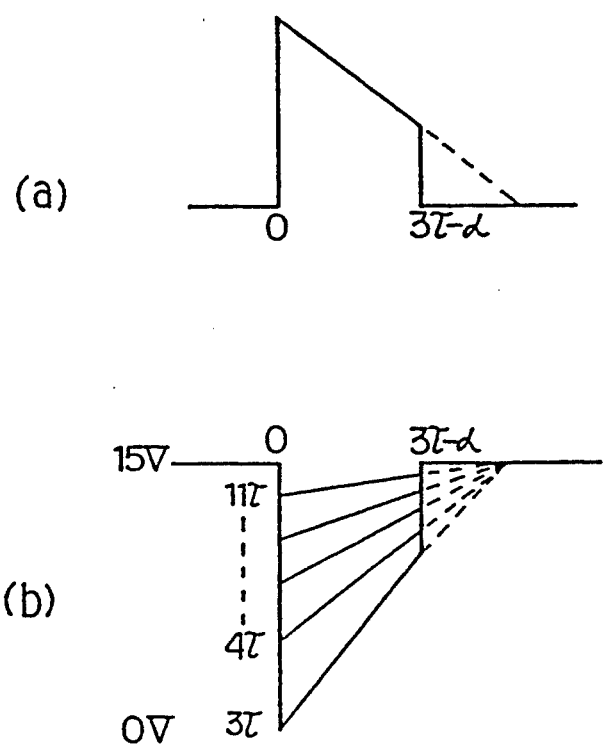
FIGS. 29(a) and 29(b) are diagrams illustrating the operational waveform of each part of the delay-time control circuit of the eighth embodiment.
Figure 30:
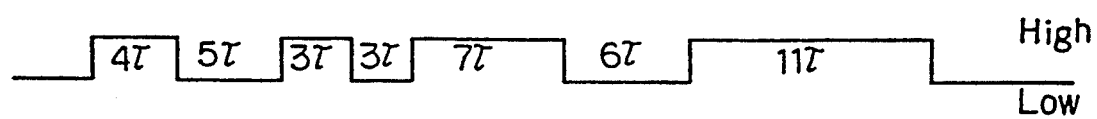
FIG. 30 illustrates an example of a compact disk signal.

FIGS. 28 and 29 show an eighth embodiment of the present invention. It has been described that in the seventh embodiment the range of the correction of the remaining heat (width the of the serrate-wave control voltage) is $3\tau$. The reason is that the minimum mark length of a CD signal is $3\tau$ and that if the correction range is above $5\tau$, the end pulse position of the pulse train for a mark length $3\tau$ will be largely delayed from a specified position. However, there are some cases where with respect to a pulse train of a longer mark length ( for example ), above $7\tau$), a wider range of correction ( for example, above $5\tau$) is required to be made to obtain a pulse train very similar to an input pulse train. In this embodiment, the end pulse of a pulse train of a shorter mark length appears in the specified position even when a wider range of correction was made.

The structure of a delay-time control circuit of this embodiment is shown in FIG. 28. The delay-time control circuit is different in part from the circuit of FIG. 26, and characterized in that it has a switch 102 for selectively connecting the minus input side of a subtraction circuit 101 to an electric potential of 0 V, a switch control circuit 103 for controlling the switch 102, and an inverter 104 for inverting a first delay signal $D_1$ and inputting the same to the switch control circuit 103. In the switch control circuit 103, a switch control signal such as a first delay signal $D_1$ is inputted. The first delay signal $D_1$ becomes "Low" when a mark length appears and "High" when a space length appears. Therefore, by adjusting the first delay signal $D_1$ at the switch control circuit 103 to control the switch 102, the voltage of the minus input side of the subtraction circuit 101 can be always set to 0 V immediately before the mark length ends.

Consider a case where a pulse width of $4\tau$ is set in the above described correction-range set circuit 90 and a pulse train of a mark length $3\tau$ is inputted to the above described voltage controlled delay circuit 83. The input waveform of the subtraction circuit 101 becomes the waveform shown in FIG. 29(a), and the output waveform becomes the waveform shown in FIG. 29(b). Therefore, if the output waveform of the subtraction circuit 101 is applied to the above described voltage controlled delay circuit 83, then the delay time of the delay circuit 83 returns back to a stable state immediately before the end pulse of the pulse train of the mark length $3\tau$ is inputted. Accordingly, the end pulse is outputted at the position of (input time + 700 ns), as in the case of the end pulses of the pulse trains of the other mark lengths.

With respect to pulse trains of longer mark lengths than the pulse width set in the above described correction-range set circuit 90, there is no influence, since the above described switch 102 has been switched off until the control signal of the set pulse width becomes a stable state.

While certain representative embodiments and details have been shown for the purpose of illustrating the invention, it will be apparent to those skilled in this art that various changes and modifications may be made therein without departing from the scope of the invention.

What we claim is:

1. A write control method for writing data represented by pit length on an optical disk medium using a laser in accordance with a write signal that includes mark signal parts each having a first length and space signal parts each having a second length, comprising the steps of:
   (a) converting the mark signal parts to pulses;
   (b) generating from the pulses a series of pulse trains which respectively correspond to the first lengths of the mark signal parts;
   (c) recognizing the second length of one of the space signal parts immediately before one of the mark signal parts in real time, at an end of the one of the space signal parts, to produce a recognition result;
   (d) controlling at least one of a length and an amplitude of each of the pulse trains in accordance with the recognition result obtained in said step (c); and
   (e) writing the data to the optical disk medium by applying successively the pulse trains controlled in step (d) to the laser.

2. A write control method as set forth in claim 1, wherein the mark signal parts have a predetermined pulse generation rate, and
   wherein step (b) includes the sub-step of maintaining a pulse formation rate of each pulse train to be nearly equal to the predetermined pulse generation rate of the mark signal parts.

3. A write control method for writing data represented by pit length on an optical disk medium using a laser in accordance with a write signal that includes mark signal parts each having a first length and space signal parts each having a second length, comprising the steps of:
   (a) dividing each of the mark signal parts into three parts including a start part, an intermediate part and an end part;
   (b) elevating the temperature of the optical disk medium to a writable temperature in dependence upon the start part;
   (c) maintaining a balance between the temperature of the optical disk medium and heat radiation from the optical disk medium in dependence upon the intermediate part;
   (d) maintaining a decrease in the temperature of the optical disk medium in dependence upon the end part;
   (e) converting the three parts of each of the mark signal parts to pulses having pulse widths set for said elevating, maintaining a balance and maintaining a decrease, respectively;
   (f) generating from the converted pulses a series of pulse trains which correspond to respective first lengths of the mark signal parts;
   (g) varying the number of pulses of the intermediate part of one of the mark signal parts to correspond to the first length of the one of the mark signal parts;
   (h) controlling at least one of the length and amplitude of each of the pulse trains in accordance with the second length of one of the space signal parts immediately before the one of the mark signal parts; and
   (i) applying successively the pulse trains controlled in step (h) to the laser to write on the optical disk medium.

4. A write control method for writing data represented by pit length on an optical disk medium using a laser in accordance with a write signal which includes mark signal parts each having a first length and space signal parts each having a second length, comprising the steps of:
   (a) converting the mark signal parts to pulses;
   (b) generating from the pulses a series of pulse trains which respectively correspond to the first lengths of the mark signal parts;
   (c) recognizing the second length of one of the space signal parts immediately before one of the mark signal parts at an end of the one of the space signal parts in real time, to produce a recognition result;
   (d) time condensing a part or whole of each of the pulse trains in accordance with a second length of one of the space signal parts immediately before one of the mark signal parts; and
   applying successively the pulse trains time condensed in step (d) to the laser.

5. A write control method as set forth in claim 4, wherein the mark signal parts have a predetermined pulse generation rate, and
   wherein step (b) includes the sub-step of maintaining a pulse formation rate of the each pulse train to be nearly equal to the predetermined pulse generation rate of the mark signal parts.

6. A write control apparatus for writing data represented by pit length on an optical disk medium using a laser to irradiate the optical disk medium in accordance with a write signal generated in write signal cycles using a basic clock and comprising mark signal parts each having a first length, and space signal parts, each having a second length, comprising:

first delay means for delaying by a first predetermined range each of the mark signal parts and for providing a first delayed signal based on the delaying by the first predetermined range;

second delay means for delaying the first delayed signal by a second predetermined range and for providing a second delayed signal based on the delaying by the second predetermined range;

control signal generating means for generating a start part control signal, an intermediate part control signal and an end part control signal based on the first and second delayed signals and the corresponding one of the mark signal parts;

pulse forming means for converting each of the start part control signal, intermediate part control signal and end part control signal to a pulse or pulses, and for generating a series of pulse trains which respectively correspond to the first lengths of the mark signal parts by combining the pulse or pulses converted from each of the control signals; and pulse train control means for controlling at least one of the length and the amplitude of each of the pulse trains in accordance with the second length of one of the space signal parts immediately before each of the mark signal parts.

7. A write control apparatus as set forth in claim 6, which further comprises:

means for setting independently a pulse width of each pulse of the pulse trains.

8. A write control apparatus set forth in claim 6, wherein said pulse forming means includes:

a plurality of channels, each having an output, means for outputting pulses from the output of each of said plurality of channels, and pulse prohibition means for independently prohibiting generation of at least one pulse from the output of any channel.

9. A write control apparatus as set forth in claim 8, wherein the laser comprises a plurality of light output generating means each connected to the output of one of said channels, for outputting a light output independently from others of said light output generating means.

10. A write control apparatus as set forth in claim 9, wherein each of said plurality of light output generating means includes:

means for controlling the light output based on the mark length control signal.

11. A write control apparatus as set forth in claim 6, wherein said pulse forming means further comprises:

a pulse forming clock having a cycle shorter than one cycle of the basic clock of the write signal.

12. A write control apparatus as set forth in claim 6, wherein said pulse train control means generates a reference signal having a predetermined length and includes:

means for comparing the reference signal with the length of the space signal part immediately before the mark signal part, means for producing a mark length control signal, and means for controlling the pulse trains based on the mark length control signal.

13. A write control apparatus as set forth in claim 12, wherein said pulse train control means generates a plurality of reference signals.

14. A write control apparatus as set forth in claim 6, wherein said pulse train control means includes:

at least one set of passing path groups including a plurality of passing paths which have a predetermined passing time, space recognition mans for recognizing the second length of the space signal part immediately before the mark signal part, and passing path selection means for selecting the passing path of a start part pulse from the recognizing obtained from said space recognition means.

15. A write control apparatus as set forth in claim 14, wherein said plurality of passing paths includes:

means for varying the passing time according to a radius position of the optical disk medium.

16. A write control apparatus as set forth in claim 15, wherein said at least one set of passing path groups further comprises:

a plurality of sets of passing path groups where maximum passing times in each passing path group are different.

17. A write control apparatus as set forth in claim 15, wherein said at least one set of passing path groups further comprises:

a plurality of sets of passing path groups, where maximum passing times in each passing path group are different.

18. A write control apparatus as set forth in claim 14, wherein said at least set of passing path groups comprises:

a plurality of sets of passing paths groups, where maximum passing times in each passing path group are different.

19. A write control apparatus as set forth in claim 14, wherein said pulse train control means includes:

means for controlling the amplitude of the pulse train based on the recognizing obtained from said space recognition means.

20. A write control apparatus for writing data represented by a pit length on an optical disk medium of the optical disk memory in accordance with a write signal comprising mark signal parts each having a first length, and space signal parts each having a second length, comprising:

pulse forming means for converting the mark signal parts to pulses and for generating a series of pulse trains which correspond to the first lengths of the mark signal parts, respectively;

space recognition means for recognizing the second length of one of the space signal parts immediately before one of the mark signal parts at one end of the one of the space signal parts in real time and for providing a result based on the recognizing; and time condensation means for time condensing at least part of each of the pulse trains in accordance with the recognition result so that a position of an end pulse of the pulse train becomes the same position.

21. A write control apparatus as set forth in claim 20, wherein said time condensation means comprises:

delay-time control means for producing a serrate voltage signal; and voltage controlled variable delay means, receiving the serrate signal from the delay-time control means and for varying a delay time of the pulse trains based on the serrate signal.

22. A write control apparatus as set forth in claim 21, wherein said voltage controlled variable delay means comprises a variable capacity diode operatively connected to an inductance.

23. A write control apparatus as set forth in claim 21, wherein said delay-time control means includes serrate wave generating means for generating the serrate signal having a predetermined time width and a peak voltage, delay-time set means for amplifying in a plurality of amplifiers the serrate signal, for setting the peak voltage of the serrate signal and for providing an output having a voltage, and switch means for selecting the output of said delay-time set means in accordance with the recognizing performed by said space recognition means.

24. A write control apparatus as set forth in claim 23, wherein said switch means includes a switch, having a switch timing and operatively connected to receive the output of said delay-time set means, for selectively setting the voltage of the output to a predetermined electric potential, and wherein said delay-time set means comprises switch control means for controlling the switch timing of said switch.

25. A write control apparatus as set forth in claim 24, wherein said serrate wave generating means comprises:

monostable multivibrator means for generating a pulse having a predetermined time width, and differentiation means for differentiating the pulse of said monostable multivibrator means to produce the serrate signal.

26. A write control apparatus as set forth in claim 23, wherein said serrate wave generating means comprises:

monostable multivibrator means for generating a pulse having a predetermined time width, and differentiation means for differentiating the pulse of said monostable multivibrator means to produce the serrate signal.

27. A write control apparatus for writing data represented by pit length on an optical disk medium using a laser in accordance with a write signal including mark signal parts each having a first length and space signal parts each having a second length, comprising:

dividing means for dividing each of the mark signal parts into three parts including a start part, an intermediate part and an end part;

pulse converting means for converting the three parts of each of the mark signal parts to pulses;

temperature control means for elevating the temperature of the optical disk medium to a writable temperature in dependence upon the start part, for maintaining a balance between the temperature of the optical disk medium and heat radiation from the optical disk medium in dependence upon the intermediate part and for maintaining a decrease in the temperature of the optical disk medium in dependence upon the end part;

pulse train generating means for generating from the pulses a series of pulse trains corresponding to respective first lengths of the mark signal parts; and pulse controlling means for varying a number of pulses of the intermediate part of one of the mark signal parts in dependence upon the first length of the one of the mark signal parts, and for controlling at least one of the length and amplitude of each of the pulse trains in dependence upon the second length of one of the space signal parts immediately before the one of the mark signal parts.

28. A write control apparatus as set forth in claim 27, wherein said temperature control means comprises pulse width control means for controlling the pulse widths of the converted pulses.

* * * * *

UNITED STATES PATENT AND TRADEMARK OFFICE
CERTIFICATE OF CORRECTION

PATENT NO. : 5,327,411

DATED : July 5, 1994

INVENTOR(S) : IWASA et al.

It is certified that error appears in the above-indentified patent and that said Letters Patent is hereby corrected as shown below:

On the title page:

Item: [75] Inventors: after the third inventor's name, change "Tama" to --Zama--;
[30] Foreign Application Priority Data, change "1-68355" to --1-68335--;
[56] References Cited, under "OTHER PUBLICATIONS", line 2, change "63-26663" to --63-266633--;

Col. 3, line 12, after "63-160017" insert --,--.

Col. 5, line 24, change "part" to --parts--.

Col. 9, line 4, change "cold" to --could--;
line 66, delete "of".

Col. 10, line 36, change "lit" to --11,--.

Col. 11, line 12, after "means)" insert --1--;
line 34, after "the" (second occurrence) insert --write--.

Col. 12, line 7, after "having" insert --a--;
line 14, after "becomes" insert --0--;
line 40, after " "2" " insert --,--;
line 44, after " "15" " insert --,--.

UNITED STATES PATENT AND TRADEMARK OFFICE
CERTIFICATE OF CORRECTION

PATENT NO. : 5,327,411
DATED : July 5, 1994
INVENTOR(S) : IWASA et al.

It is certified that error appears in the above-indentified patent and that said Letters Patent is hereby corrected as shown below:

Col. 13, line 15, change "$A = D_1 \cdot (D_1 \cdot D_2)$" to -- $A = D_1 \cdot (\overline{D_1 \cdot D_2})$ --.

Col. 14, line 5, after "$D_1$" insert --,--;
line 14, change "$D = D_1 \cdot (D_1 \cdot D_3)$" to -- $D = D_1 (\overline{D_1 \cdot D_3})$ --.

Col. 16, line 3, after "and" insert --2--.

Col. 17, line 53, change "$D_1$" to -- $\overline{D_1}$ --;
line 55, change "$D_1$" to -- $\overline{D_1}$ --;
line 57, change "$D_1$" to -- $\overline{D_1}$ --.

Col. 18, line 2, change "$D_1$" to -- $\overline{D_1}$ --;
line 64, change "length sin" to --lengths in--.

UNITED STATES PATENT AND TRADEMARK OFFICE
CERTIFICATE OF CORRECTION

PATENT NO. : 5,327,411
DATED : July 5, 1994
INVENTOR(S) : IWASA et al.

It is certified that error appears in the above-indentified patent and that said Letters Patent is hereby corrected as shown below:

Col. 22, line 60, change "( for example )" to --(for example)--;
line 61, change "( for" to --(for--.

Col. 23, line 9, change "$D_1$" to -- $\overline{D_1}$ --;

line 10, change "$D_1$" to -- $\overline{D_1}$ --;

line 12, change "$D_1$" to -- $\overline{D_1}$ --.

Col. 24, line 62, before "applying" insert --(e)--.

line 26, after "groups" insert --,--.

Col. 27, line 11, after "includes" insert --:--.

Signed and Sealed this

Thirtieth Day of July, 1996

Attest:

BRUCE LEHMAN

Attesting Officer

Commissioner of Patents and Trademarks